June 9, 1936. M. L. NELSON 2,043,707
ELECTRIC SIGN
Filed Sept. 21, 1932 14 Sheets-Sheet 1
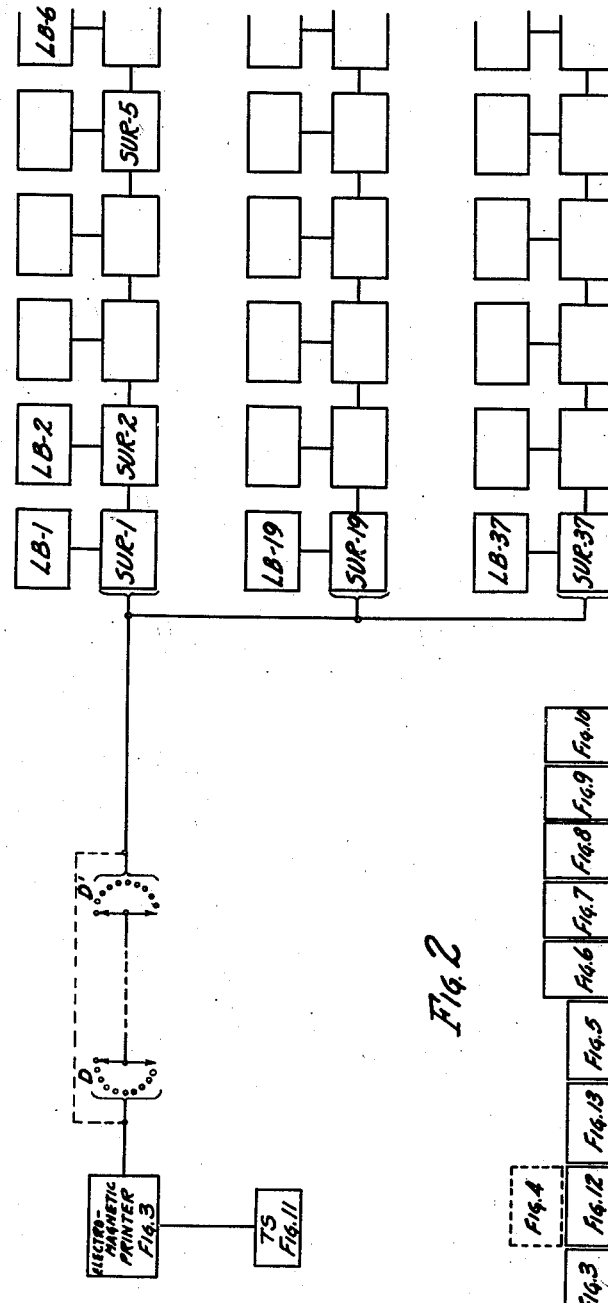
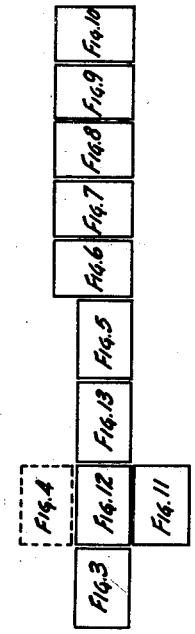
INVENTOR—
MARTIN L. NELSON
ATTY.

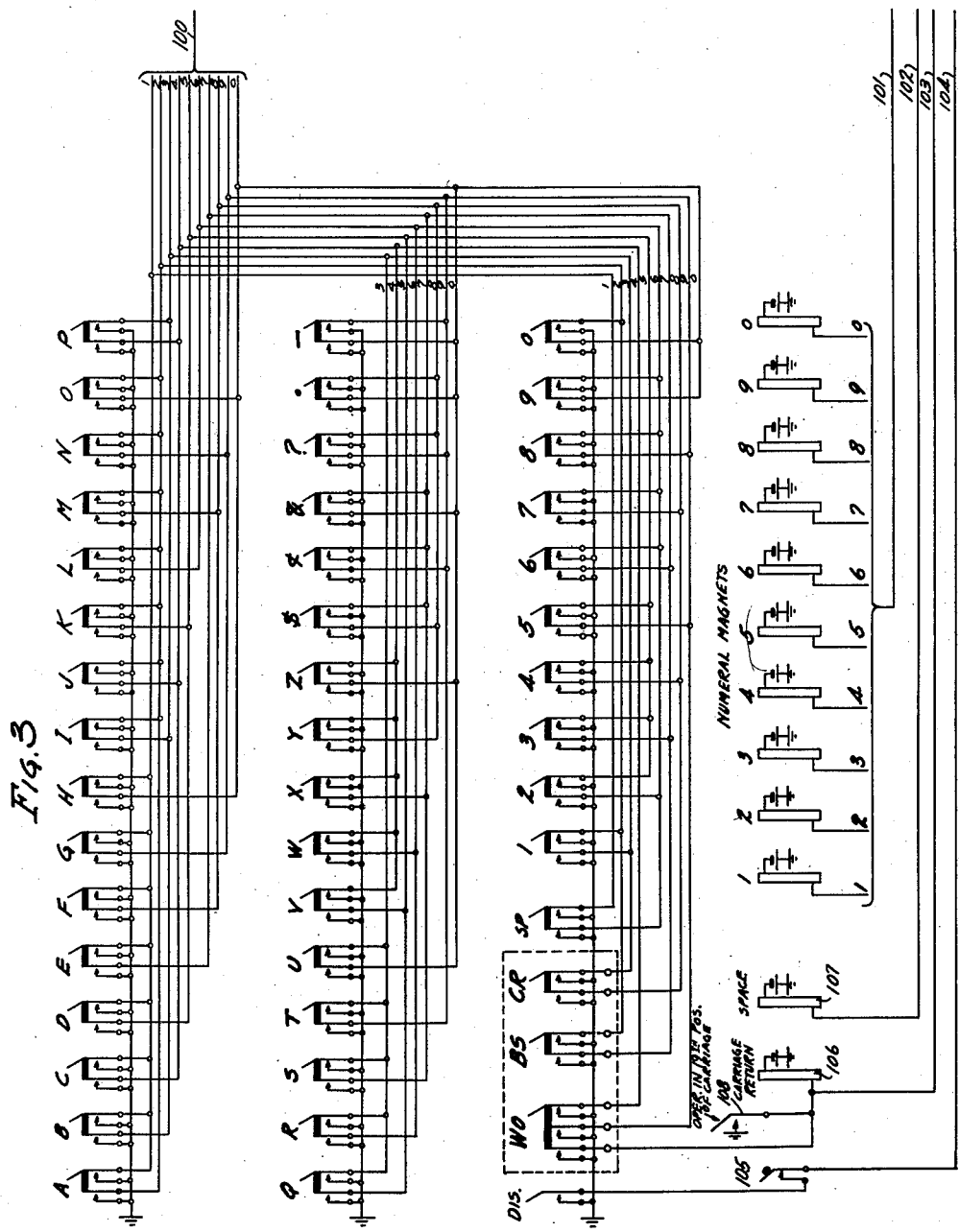

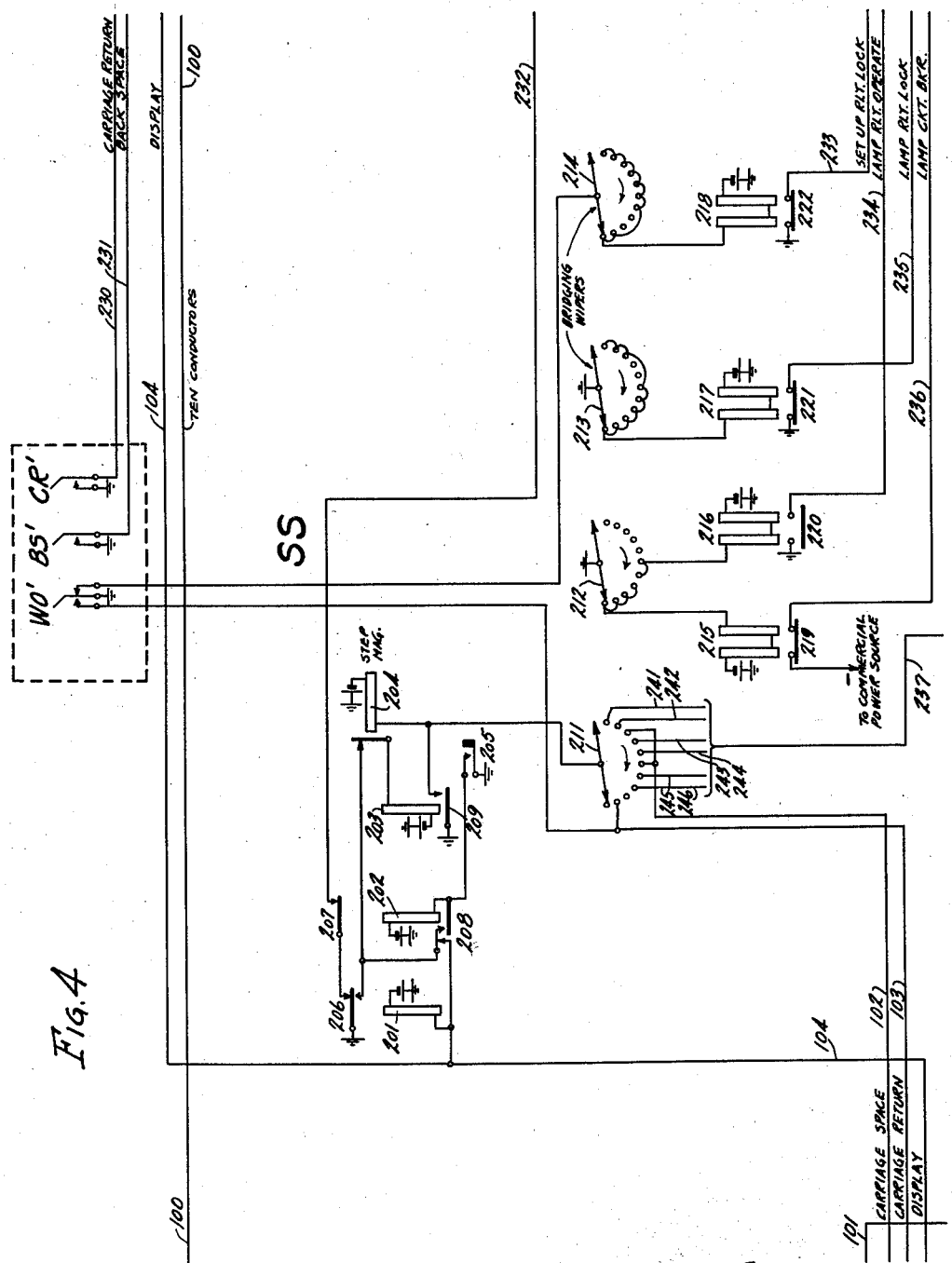

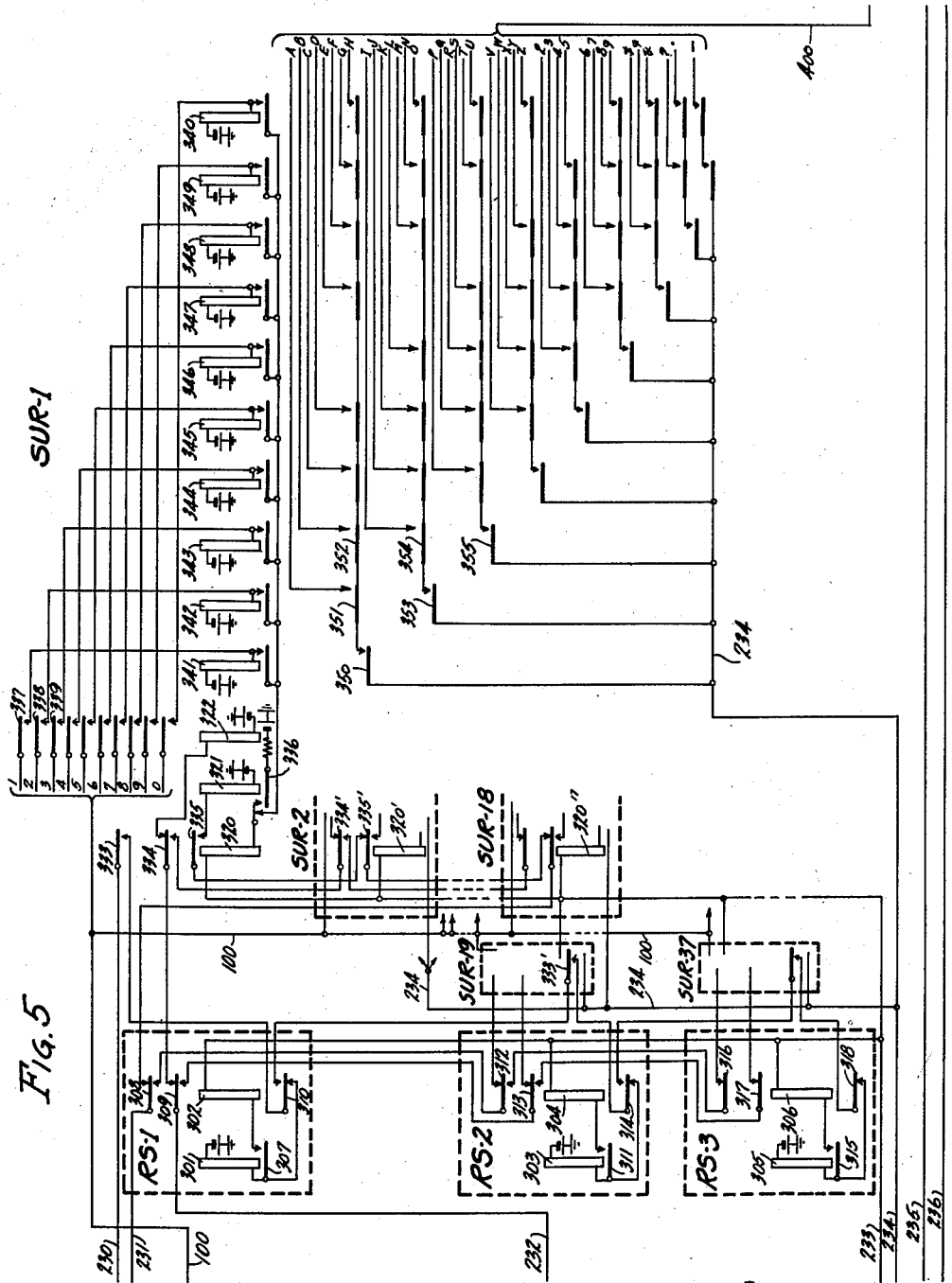

June 9, 1936. M. L. NELSON 2,043,707
ELECTRIC SIGN
Filed Sept. 21, 1932 14 Sheets-Sheet 5

June 9, 1936.  M. L. NELSON  2,043,707
ELECTRIC SIGN
Filed Sept. 21, 1932  14 Sheets-Sheet 9

—INVENTOR—
MARTIN L. NELSON
ATTY.

June 9, 1936.     M. L. NELSON     2,043,707
ELECTRIC SIGN
Filed Sept. 21, 1932     14 Sheets-Sheet 11

FIG. 12

INVENTOR —
MARTIN L. NELSON
ATTY.

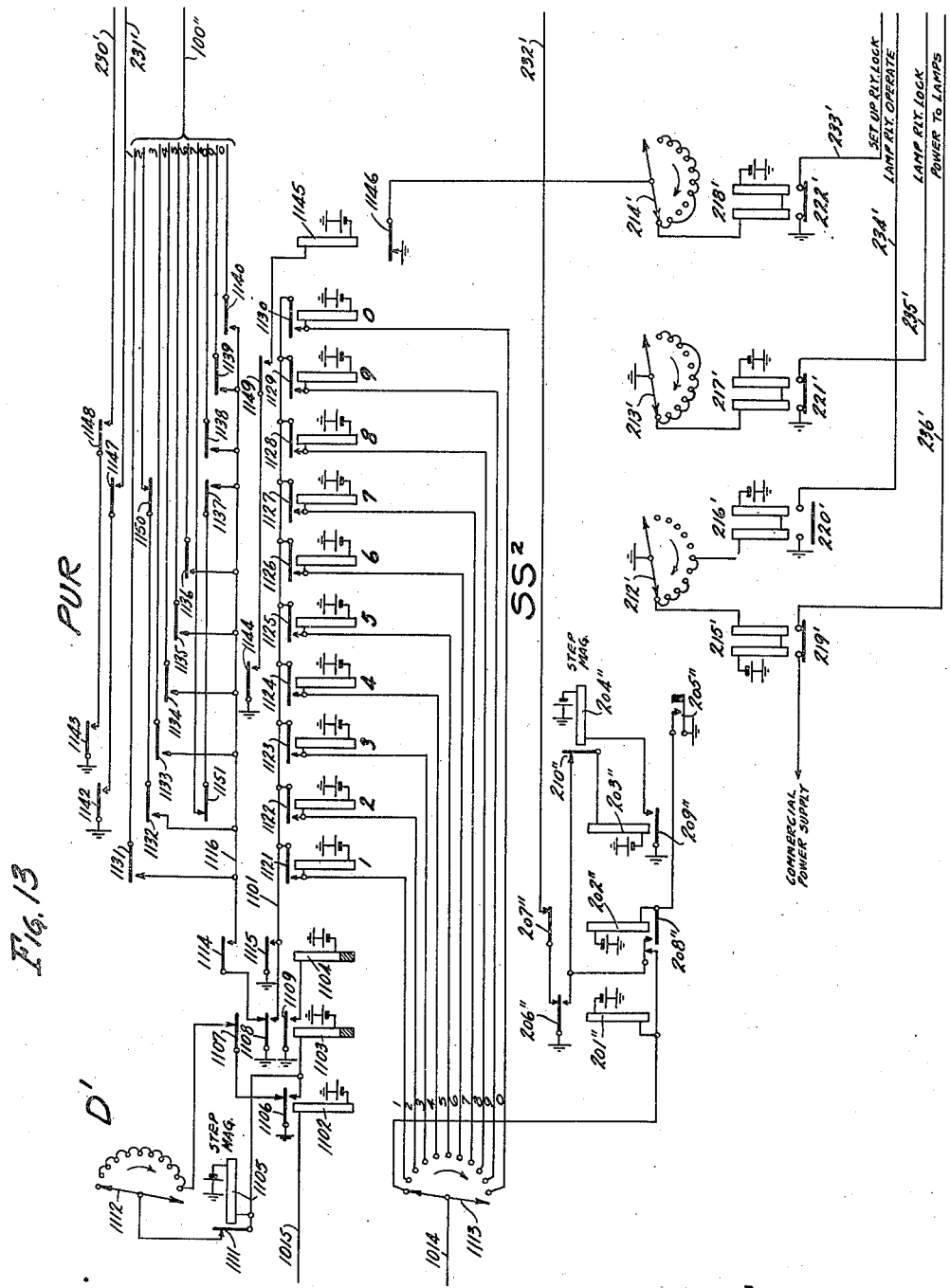

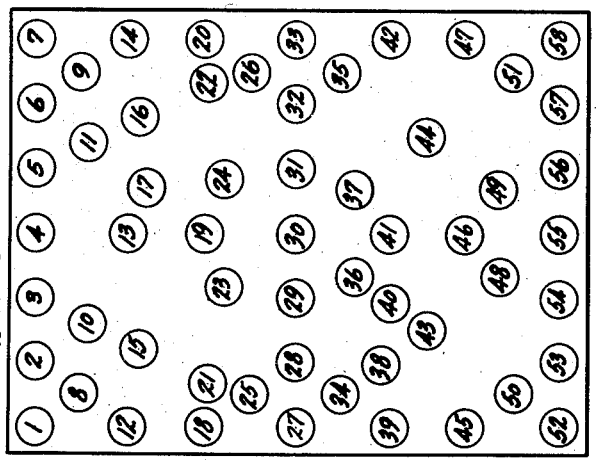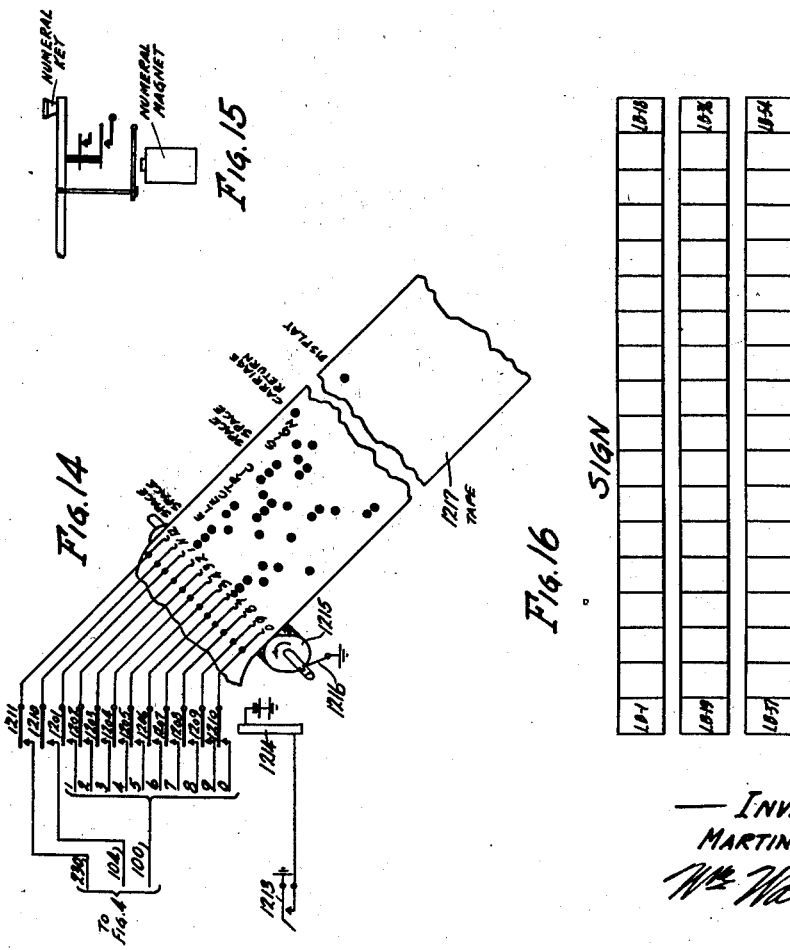

June 9, 1936.  M. L. NELSON  2,043,707

ELECTRIC SIGN

Filed Sept. 21, 1932  14 Sheets-Sheet 14

Fig. 18

—INVENTOR—
MARTIN L. NELSON

Atty.

Patented June 9, 1936

2,043,707

UNITED STATES PATENT OFFICE 2,043,707

ELECTRIC SIGN

Martin L. Nelson, Park Ridge, Ill., assignor to Associated Electric Laboratories, Inc., Chicago, Ill., a corporation of Delaware Application September 21, 1932, Serial No. 634,139

12 Claims. (Cl. 177—349)

This invention relates to improvements in electrically illuminated signs in which lamps are arranged in lamp boxes, or panels, to display letter or figure characters in outline. In signs of this character, several rows of lamp boxes are usually provided to enable the display of letters to form words or other characters for advertising purposes.

The main object of the present invention is to provide a sign of the above character which is thoroughly reliable and efficient in use, easily operated and controlled from a single typewriter keyboard, and in which the cost of manufacture as well as operation has been reduced to a minimum.

One of the main features of the present invention relates to the means for coding each of the letters or characters and for transmitting the character in code, after which the code is translated to operate the character-forming relays which directly control the lamp circuits.

Another feature relates to the coding and translating circuits which enable the sign to be controlled over a two-conductor trunk from a point remote from the sign.

Another feature relates to the means which automatically enables a succeeding display to be prepared while the preceding display is illuminated and in which the preceding display is put out and replaced by the second or prepared display.

Another feature relates to the means for erasing a prepared display for a single lamp box or the entire prepared display on a plurality of lamp boxes.

Another feature relates to the means for skipping an entire row of lamp boxes or a plurality of lamp boxes in a row after a complete word has been prepared or set up on the set-up relay groups to thereby prepare the next row of lamp boxes to receive the registration for display.

A still further feature relates to a time switch and means by which at the time of display the time switch automatically controls the numeral magnets on the typewriter to print the time of day such display, as was just previously printed by the typewriter, was illuminated.

Other features relate mostly to improved circuit arrangements and will be apparent from the following description.

Fig. 1 diagrammatically illustrates a one-line diagram of the complete system.

Fig. 2 shows the manner in which the various sheets of drawings are to be arranged.

Fig. 3 shows the spring combinations operated by the character keys and the numeral magnets for operating the numeral character keys of an "Electromatic" printer. This printer or typewriter is manufactured by the Electromatic Typewriters Inc., of Rochester, New York. The springs shown have been added to the keys to close certain combinations of circuits when the keys are operated.

Fig. 4 shows a sequence switch SS for connecting the various sources of current to the set-up relays shown in Fig. 5 and to the lamp relays and lamps shown in Figs. 6 to 10, inclusive. The sequence switch SS also connects the time switch TS, shown in Fig. 11, to the numeral magnets of the "Electromatic" printer shown in Fig. 3.

Fig. 5 shows three sets of row-space relays RS1, RS2, and RS3 in the left-hand portion, and in the right-hand portion shows the first group of set-up relays SUR—1. The second, eighteenth, nineteenth, and thirty-seventh sets of set-up relays, SUR—2, SUR—18, SUR—19, and SUR—37, are diagrammatically illustrated, together with the chain circuits connecting the various groups of set-up relays.

Figs. 6 to 10, inclusive, show the lamp relays, lamps, and circuits therefor for the first lamp box.

Figure 6:
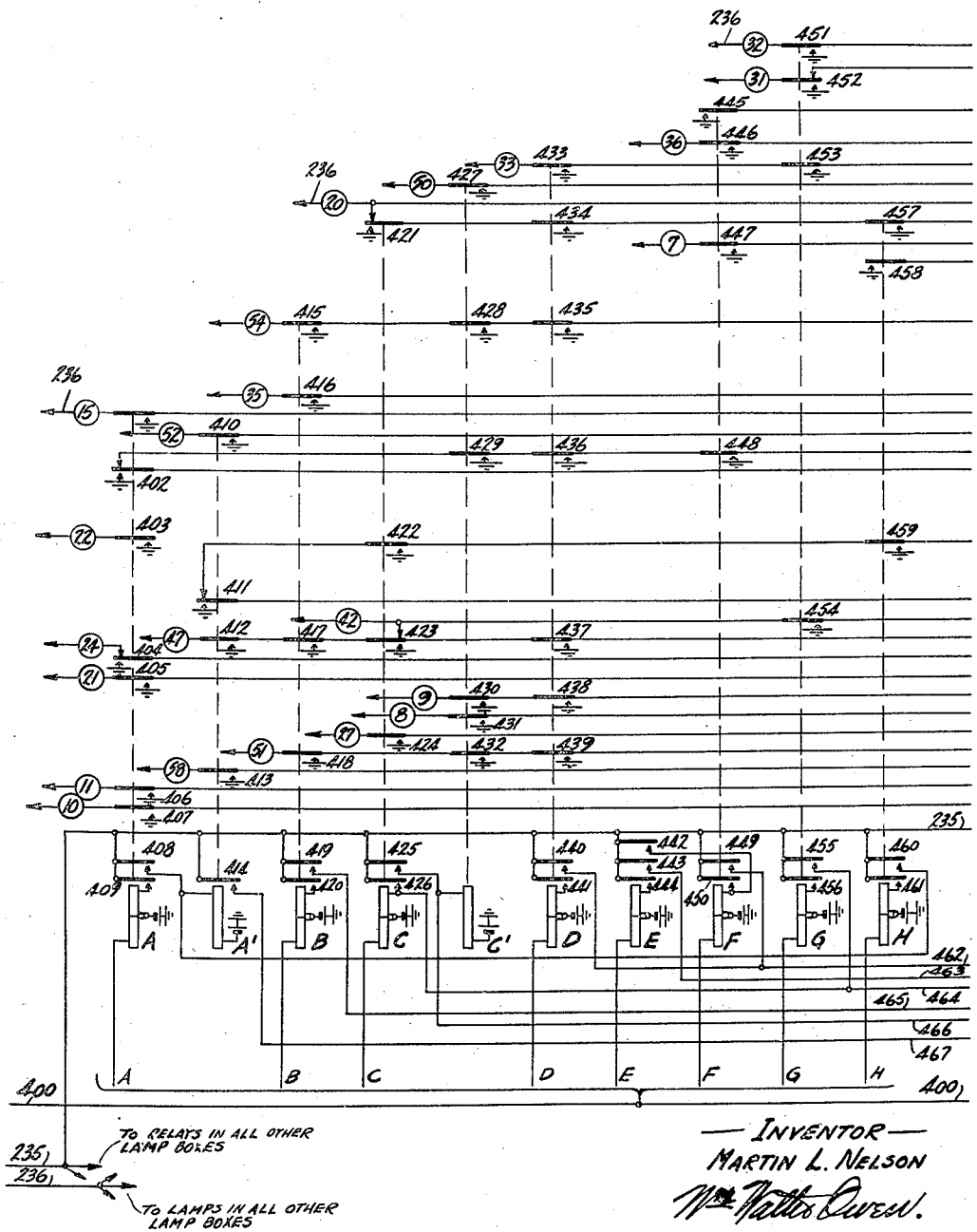
Figure 7:
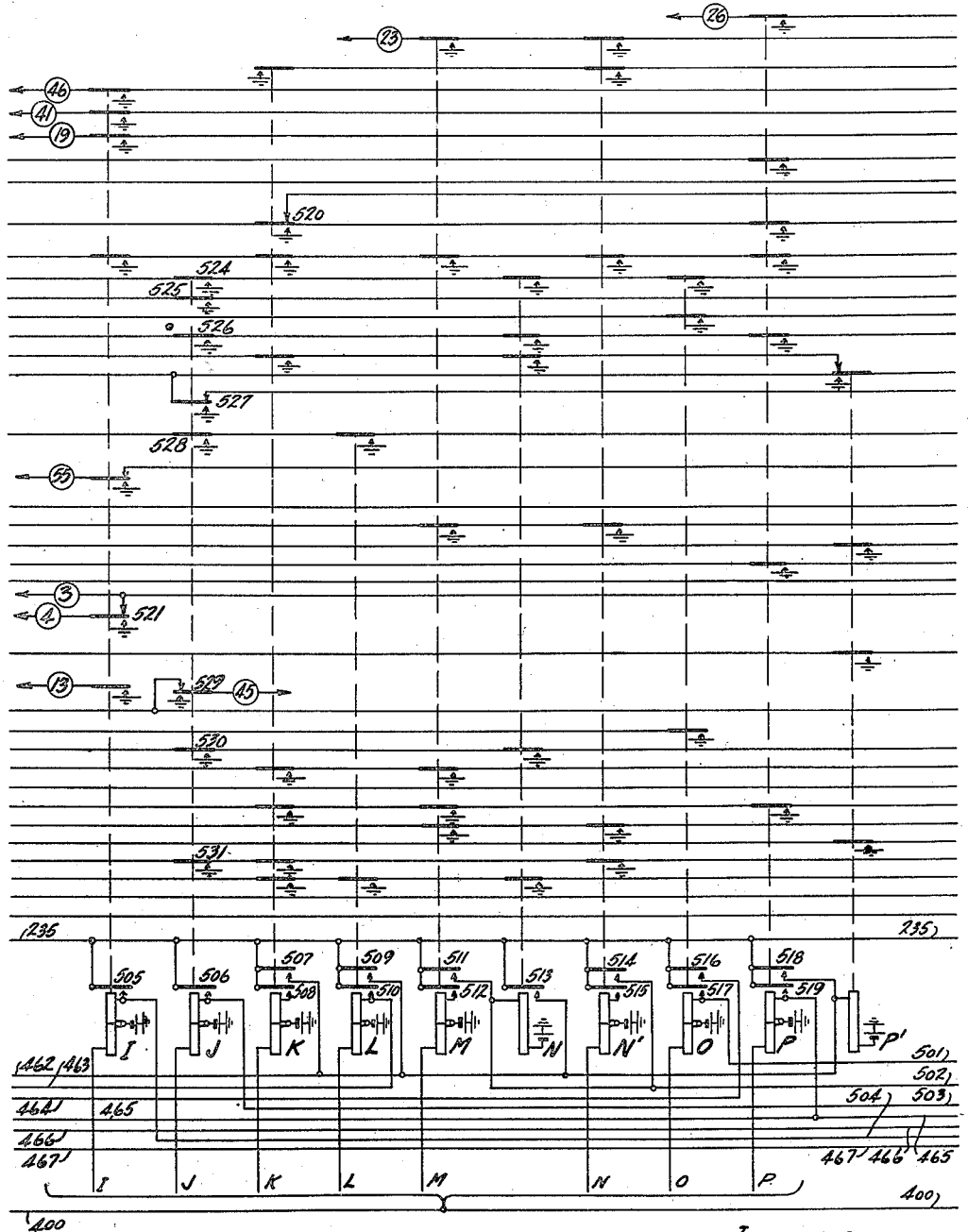
Figure 8:
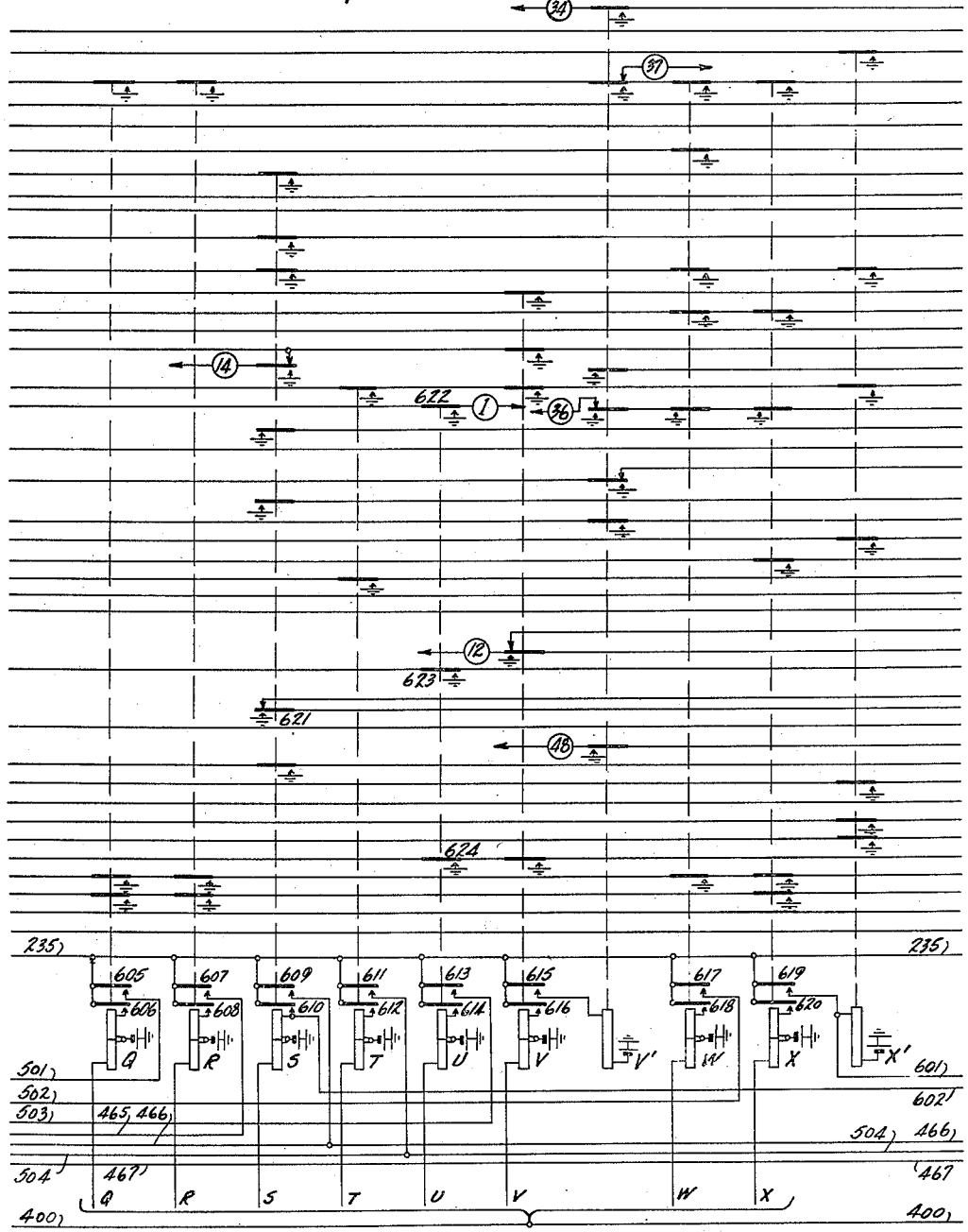
Figure 9:
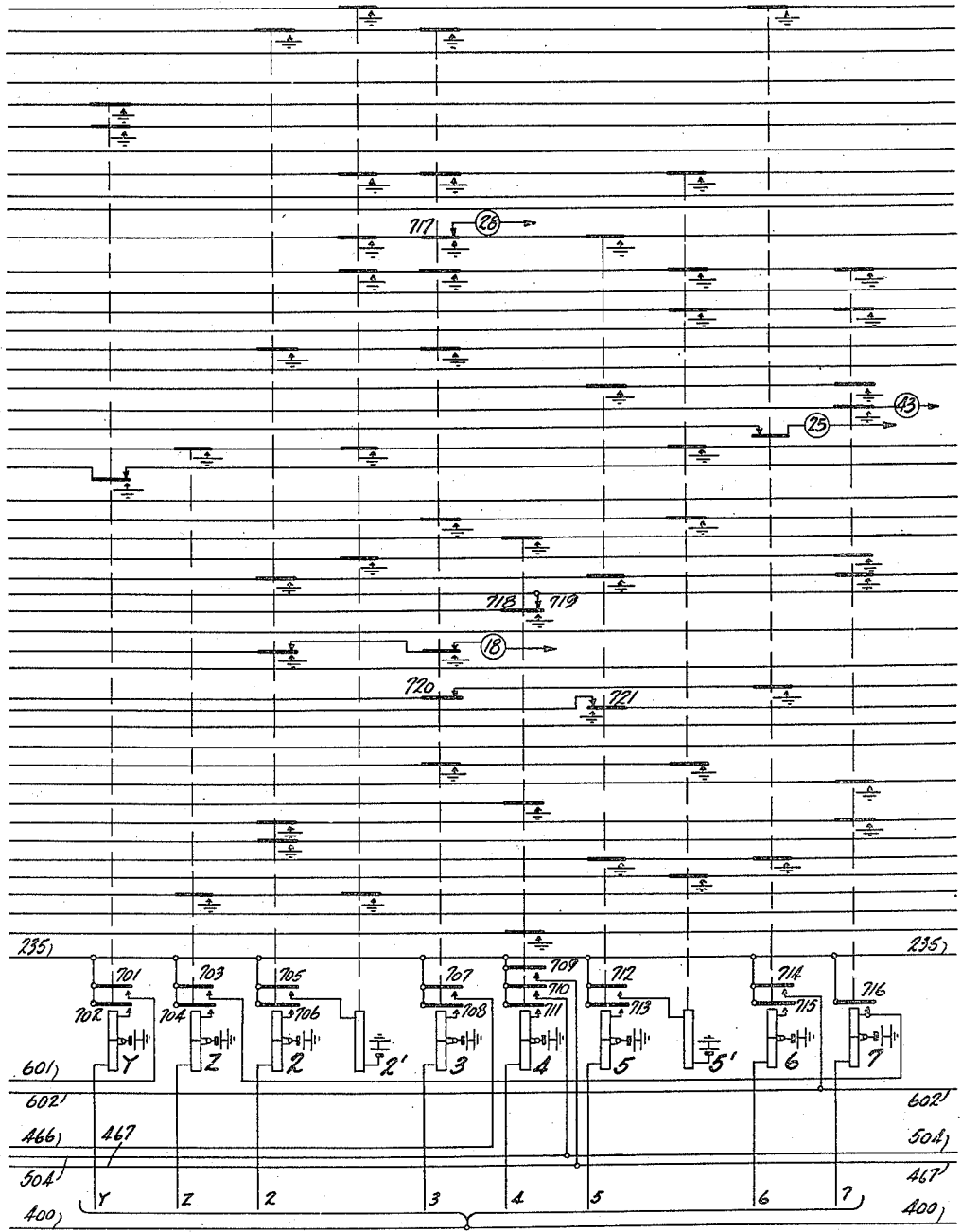
Figure 10:
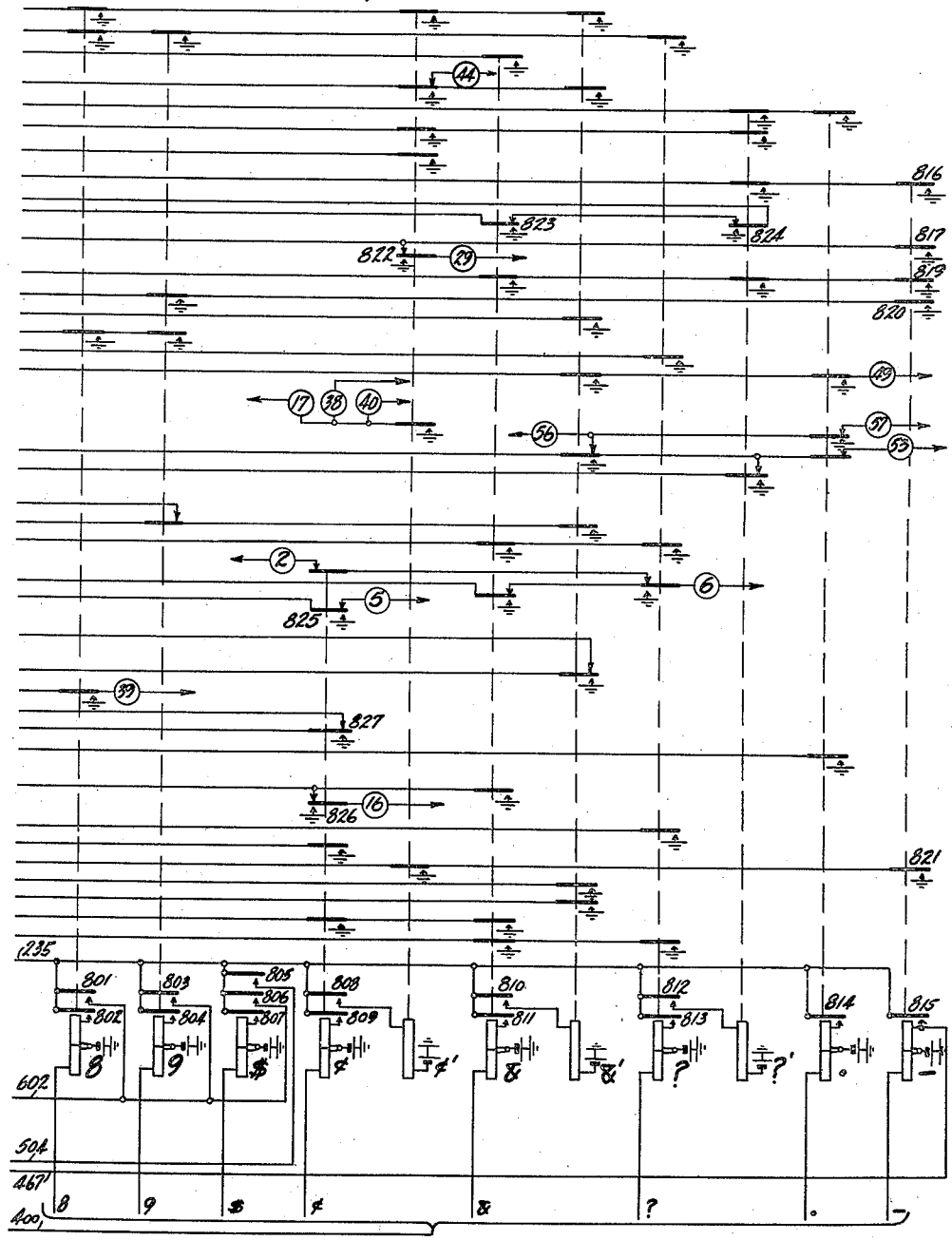
Figure 11:
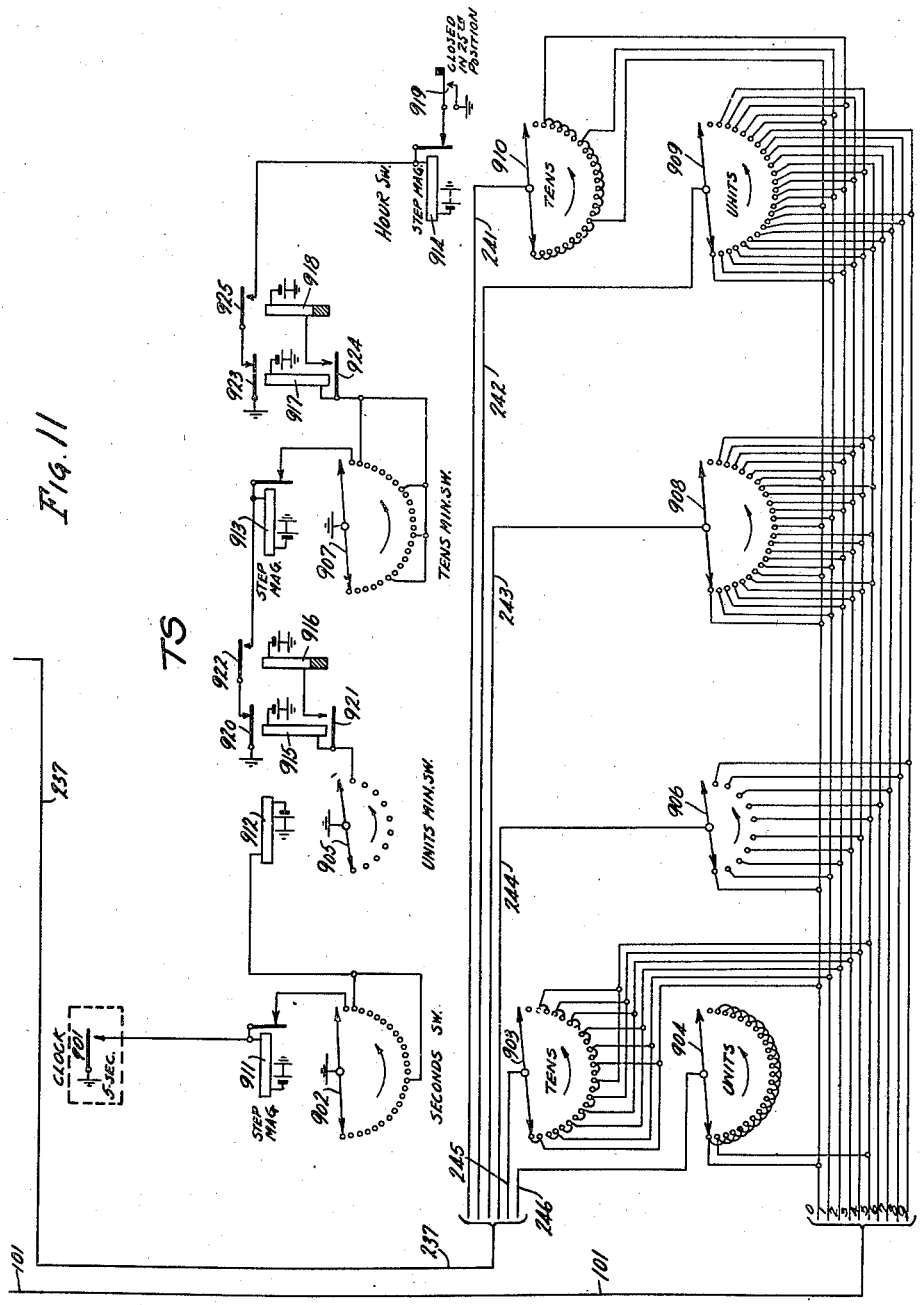

Fig. 11 shows a time switch TS and clock for controlling the "Electromatic" printer to print the time of day when the lamps of the sign are first illuminated for each display.

Figs. 12 and 13 are to replace Fig. 4 when it is desired to control the electric sign from a remote point.

Fig. 12 shows a set of transfer relays TR which pick up the code as determined by the keys operated in Fig. 3 and a distributor switch D. A sequence switch SS' connects the time switch TS to the numeral magnets in the printer.

Fig. 13 shows a set of pick-up relays PUR which are sequentially connected to the conductor 1014 by way of the distributor switch D' which operates in synchronism with the distributor switch D shown in Fig. 12. A sequence switch SS² connects the various sources of current to the set-up relays shown in Fig. 5 and to the lamp relays and lamps shown in Figs. 6 to 10, inclusive.

Fig. 14 diagrammatically illustrates mechanism for controlling the electric sign from a punched tape or cards.

Fig. 15 illustrates how the key spring combinations are controlled by the keys of the "Electromatic" printer and how the magnets in turn control the keys.

Fig. 16 shows a preferable manner of arranging the lamp boxes of the sign, there being three rows of eighteen lamp boxes.

Fig. 17 shows a single lamp box and the location of each of the fifty-eight lamps therein.

Fig. 18 is a chart for indicating when the circuits for the lamps are closed or opened for each character, the top horizontal row indicating the characters and the first vertical left-hand row indicating the lamps. "X's" in the vertical rows below the characters indicate in the horizontal rows of the lamps when the circuits of such lamps are closed, and "O's" indicate when the circuits are opened. The shapes of all the characters may be easily ascertained from both Figs. 17 and 18.

While a plurality of current sources have been shown throughout the drawings, it will be understood that only one battery is provided for operating the relays and switches, while the local commercial source is used for lighting the lamps.

*General description*

Referring now to the "Electromatic" printer diagrammatically illustrated in Fig. 3, the printer comprises a motor-driven typewriter such as disclosed in the publication of "Product Engineering", pages 513 to 516, of November, 1930, and in the publication, "The Story of Electromatic", published by the Electromatic Typewriters, Inc., Rochester, New York. During the time the Electromatic printer is in use, the small electric motor for controlling the same is in constant operation and is constantly operating a soft rubber roller. To each character key there has been added a spring combination which is closed when the key is operated. Each numeral character key, in addition to being provided with a spring combination, has been provided with a magnet for operating such key and spring combination. The mechanical arrangement by means of which the key-bar and springs are operated by the magnet is illustrated in Fig. 15. When the numeral magnet is energized, the key-bar, which is linked to the armature of the magnet, is operated to close the spring combination. Also, when any letter character key is operated by hand, the spring combination associated therewith is closed by the operation of the key-bar. Whenever a key-bar is operated, a cam thereon comes in contact with the rotating roller. The cam then instantly turns through one-half revolution, and in so doing actuates the type bar which prints the character. This operation also causes the complete operation of the spring combination. Each cam is pivoted at one end of a bell crank, forming part of the linkage it operates. Normally, a stop on the side of the cam holds each cam a few thousandths of an inch out of contact with the surface of the roller, but when a key-bar corresponding to a given cam is operated, a spring forces the serrated surface of the cam against the soft rubber roller and the two rotate together without slippage. In so doing, the cam pivot and the link to which it is attached are forced away from the roller. It is this motion, for which the motor supplies the power, that actuates both the spring combinations and the type bars. Since the mechanical construction of the Electromatic printer is not part of this invention, it is believed that this general description of its operation will suffice. Any further details regarding the mechanical operation of this type of printer may be had by referring to the aforesaid publications.

A carriage-return magnet, such as 106, has been added to the printer for operating the carriage-return key to return the carriage to normal position and to space the paper in the well-known manner. A pair of springs 108 have been provided which are closed when the carriage reaches its 19th position to operate the carriage-return magnet. The carriage-return magnet, in addition to returning the carriage to its normal or 1st position, also operates the carriage-return spring combination CR or CR'. A space magnet, such as 107, has also been added to cause the printer to operate the space key and spring combination SP. Off-normal springs 105 have been added which are normally closed when the carriage of the printer is in normal position and open as soon as the carriage moves in its first step. A display key DIS has also been added.

The error or wipe-out key WO, the back-space key BS, and the carriage-return key CR shown in the dotted rectangle are to be used only with Figs. 12 and 13 when the sign is located at a remote point. The keys WO', BS', and CR' shown in the dotted rectangle in Fig. 4 are the wipe-out, back-space, and carriage-return keys, respectively, which are used in conjunction with Fig. 4 and are to be substituted for keys WO, BS, and CR shown in Fig. 3 when the sign is not located at a remote point from the printer. The various spring combinations shown, when operated, connect ground to the conductors 1 to 6, inclusive, included in cable 100, in code combinations. The cable 100 extends in multiple to each set-up relay group and is operatively connected thereto only when the connecting relay of such set-up relay group is energized.

The sequence switch SS in Fig. 4 comprises a well-known rotary step-by-step type of switch in which the wipers 211 to 214, inclusive, move one step in the direction indicated by the arrow upon each deenergization of the motor magnet 204. The relays 201 to 203, inclusive, together with the off-normal springs 205, which close when the wipers move off normal, control the stepping operation of the switch at the proper time. Circuit breakers 215 to 218, inclusive, are controlled by the sequence switch wipers to furnish the necessary sources of energy at the proper intervals as determined by the wiring of the sequence switch bank contacts.

Referring now to Fig. 5, the first set-up relay group SUR—1 comprises a transfer relay 320, a back-space relay 321, a connecting relay 322, and code-receiving relays 341 to 340, inclusive. These code-receiving relays control the circuits to the lamp relays in the first lamp box shown in Figs. 6 to 10, inclusive. In this particular embodiment there are provided three rows of set-up relay groups with eighteen set-up relay groups in each row. Only the transfer relay 320' of the second set-up relay group SUR—2 and the transfer relay 320$^{17}$ of the eighteenth set-up relay group SUR—18 and the connecting chain circuits of the first row have been shown, while the second row of set-up relay groups is indicated as starting with set-up relay group SUR—19 and the third row as starting with set-up relay group SUR—37, it being understood that there is one set-up relay group for each lamp box as indicated in Fig. 1. A pair of relays, such as 301 and 302, is provided for each row of set-up relay groups to provide means for switching from one row to the next succeeding row after a complete word has been set up in the first row without the necessity of operating the space key a plurality of times for the remaining unoperated set-up relay groups in such a row. The relays in the first set-up relay group SUR—1 operatively connect the lamp relay operate conductor 234 to the various conductors, from A to - (hyphen), included in the 40 conductor cable indicated by the reference character 400, which extends to the correspondingly indicated conductors (shown bracketed) in Figs. 6 to 10, inclusive, of the first lamp box. Each set-up relay group, in a similar manner, connects the conductor 234 to its associated lamp relays over a cable similar to cable 400.

In the lower portion of Figs. 6 to 10, inclusive, are shown the lamp or character relays which control the circuits to the various lamps in the first lamp box. The lamps are indicated by a circle and a reference character, the number of which corresponds to the number shown in Figs. 17 and 18. Each lamp in each lamp box is connected to conductor 236 as indicated by the line and arrow thereat. While only the detail circuits for one lamp box have been shown in Figs. 6 to 10, inclusive, it will be understood that each lamp box of the electric sign is similar in all respects. A source of commercial power such as 110-volt or 220-volt A. C. or D. C. current is supplied through contacts 219 of circuit breaker 215 for operating the lamps. The circuits shown in the drawings have been simplified by indicating the lamps connected to conductor 236 and to ground to make the drawings easier to read.

The time switch TS shown in Fig. 11 comprises a clock which grounds a conductor every five seconds, an hour switch, a tens minute switch, a units minute switch, and a seconds switch. Each of the switches are similar in mechanical construction to the sequence switch SS and operate their wipers one step upon the deenergization of their respective motor magnets. Briefly, every five seconds, the seconds switch operates one step and every twelfth step operates the units minute switch one step. Every tenth step of the units minute switch operates the tens minute switch one step, and every sixth step of the tens minute switch operates the hour switch one step. The lower sets of wipers of the time switch are therefore resting on the numbered conductors, included in cable 101, which correspond to the time of day; the numbers 01 to 24 indicating the twenty-four hours of the day. As will be seen, the conductors 241 to 246, inclusive, included in cable 237, extend to the lower wipers of the time switch TS for controlling the numeral magnets of the printer over the cable 101 when a registered display is first illuminated on the sign.

Referring now to Figs. 12 and 13, the distributor switch D is a rotary stepping switch which steps its wipers 1012 and 1013 upon the deenergization of its stepping magnet 1005. The transfer relays TR, numbered 1 to 0, inclusive, are connected over the 10 conductor cable 100 to the various spring combinations controlled by the keys in the Electromatic printer in Fig. 3. The transfer relays ground certain conductors terminating in the distributor switch bank dependent upon the relays operated. The sequence switch SS' is somewhat similar to the sequence switch SS in Fig. 4 and is used in Fig. 12 for connecting the time switch TS to the printer. The distributor switch D' is mechanically similar to the distributor D and the relays 1002, 1003, 1004, 1102, and the motor magnets 1005 and 1105 cause the two distributor switches to operate in synchronism so that the wipers 1013 and 1113 are in engagement with correspondingly numbered conductors. Corresponding pick-up relays PUR are therefore operated to correspond to the transfer relays which are operated. Only two conductors 1014 and 1015 connect the two distributors and, therefore, the electric sign may be operated over these conductors from a remote point without providing a large number of conductors. The transfer relays TR and distributor D translate and transmit codes corresponding to the operated keys of the printer over the conductor 1014 to the pick-up relays and distributor D'. The synchronizing of the two distributors is controlled over conductor 1015.

The distributors D and D' make a complete revolution for each code and the pick-up relays control circuits for operating the set-up relays SUR indicated in Fig. 5. The sequence switch SS² is somewhat similar to the sequence switch SS in Fig. 4 and is used for controlling the sources of current for operating the set-up and lamp relays and the lamps in a manner similar to that shown in Fig. 4. In Fig. 12, just above the distributor D, there is diagrammatically shown a method for preventing the operation of a character key of the printer at a time when the distributor D is off normal.

Fig. 14 diagrammatically represents a manner in which the electric sign may be controlled by a moving tape when the sign is to be controlled automatically instead of manually from the printer. When it is desired to do this, the key 1213 is pressed and the roller 1215 is started in operation by the same key or another key. The roller is made of conducting material and grounds the various feelers above the roller when such feelers encounter perforations in the tape 1217. In this connection the tape 1217 would be pre-punched with the display desired and may be code-punched to close circuits to relays (not shown) which stop the roller for a predetermined length of time after which the roller 1215 is again automatically started as long as the key 1213 is depressed.

*Detail description*

Having given a general description of the apparatus, the detail circuit descriptions will now be proceeded with. For this purpose, it will be assumed that the operator at the key board will type, in the same manner as in writing a letter or advertisement, the following:

AUTOMATIC ELECTRIC
COMPANY
ELECTRIC SIGNS

Upon operation of the A key, the printer prints the letter A on the tape and causes the carriage to move to its second position in the well-known manner. The operation of the A key also closes the A spring combination (Fig. 3) to connect ground to conductors 1 and 2 included in cable 100.

The following is a chart showing which of the conductors of cable 100 are grounded when the various character keys are operated:

| Key | Conductors in cable 100 | Key | Conductors in cable 100 |
|---|---|---|---|
| A | 1—2 | X | 4—7 |
| B | 1—3 | Y | 4—8 |
| C | 1—4 | Z | 4—0 |
| D | 1—5 | 1 | 2—3 |
| E | 1—7 | 2 | 5—6 |
| F | 1—8 | 3 | 5—7 |
| G | 1—9 | 4 | 5—8 |
| H | 1—0 | 5 | 5—9 |
| I | 2—3 | 6 | 6—7 |
| J | 2—4 | 7 | 6—8 |
| K | 2—5 | 8 | 6—9 |
| L | 2—6 | 9 | 6—0 |
| M | 2—8 | 0 | 2—0 |
| N | 2—9 | $ | 7—8 |
| O | 2—0 | ¢ | 7—9 |
| P | 3—4 | & | 7—0 |
| Q | 3—5 | ? | 8—9 |
| R | 3—6 | . | 8—0 |
| S | 3—7 | , | 9—0 |
| T | 3—9 | Space | 1—6 |
| U | 3—0 | Back space | 2—7 |
| V | 4—5 | Carriage return | 3—8 |
| W | 4—6 | Wipe out | 4—9 |

Before proceeding with the description, it will be further assumed that some display is at present on the sign and therefore circuit breakers 215, 217 and 218 in Fig. 4 are in energized position. Circuit breaker 215 at contacts 219 supplies the commercial source of current for lighting the lamps over common conductor 236, circuit breaker 217 at contacts 221 connects grounded battery to common conductor 235 for maintaining energized any of the lamp character relays which may at this time be operated, and circuit breaker 218 at contacts 222 prepares a circuit for locking up the set-up relays over common conductor 233 which extends to the transfer relay in each set-up relay group. Another circuit may also be traced for energizing the connecting relay 322 of the first set-up relay group SUR—1 as follows: from ground by way of armature 206 (Fig. 4) and its resting contact, armature 207, conductor 232, armature 208 and its resting contact, armature 334 and its resting contact, and through the winding of connecting relay 322 to battery. Relay 322 at its ten armatures connects the ten coding set-up relays to the ten conductor cable 100 to prepare the first set-up relay group for operation.

Responsive to the grounding of conductors 1 and 2 in cable 100, as a result of the operation of the A key and spring combination, a circuit may be traced over such conductors and armatures 337 and 338 of connecting relay 322 for energizing set-up coding relays 341 and 342. When the A key is released, ground is removed from conductors 1 and 2 in cable 100 and transfer relay 320 energizes in series with the set-up relays as follows: from grounded common conductor 233, winding of transfer relay 320, normally closed springs controlled by armature 336 of back-space relay 321 and through the locking armatures and windings of relays 341 and 342 to battery. Set-up relays 341 and 342 and transfer relay 320 are maintained energized over this circuit.

Transfer relay 320, upon energizing, at armature 333 transfers the carriage-return conductor 230 to the first set of row-space relays RS1; at armature 334 and its resting contact opens the circuit of connecting relay 322 which deenergizes and at its working contact completes a circuit for energizing the connecting relay in the second set-up relay group SUR—2; and at armature 335 prepares a circuit for the back-space relay 321 in the first set-up relay group SUR—1. The circuit for energizing the connecting relay in the second set-up relay group SUR—2 may be traced from grounded conductor 232, armature 309 and its resting contact, armature 334 and its working contact, armature 334' and its resting contact and through the winding of the connecting relay (not shown) to battery. Since all the set-up relay groups are similar, the energization of the connecting relay in the second set-up relay group SUR—2 connects the conductors in cable 100 to the ten coding relays in the second group. By the operation and release of key A, the letter A has been printed on the tape; coding set-up relays 341 and 342 in the first set-up relay group have been energized and locked; transfer relay 320 has operated to cause the connecting relay in the second set-up relay group to energize and connect the cable 100 to the coding relays therein to prepare the second set-up relay group for operation.

The operator, upon pressing the U character key, causes the printer to print the letter U on the paper and causes the U spring combination to ground conductors 3 and 0 included in cable 100. A circuit may now be traced over conductors 3 and 0 in cable 100, through the armatures of the connecting relay in the second set-up relay group SUR—2, and to relays therein corresponding to relays 343 and 340 of SUR—1. When the U key is released, ground is removed from conductors 3 and 0 in cable 100 and the transfer relay 320' energizes in series with the energized set-up relays in the second set-up relay group over a circuit including grounded common conductor 233, winding of transfer relay 320', normally closed spring controlled by the back-space relay, similar to back-space relay 321, and through the locking armatures and windings of the energized set-up relays to battery. The transfer relay 320' and the energized set-up relays are maintained energized over this circuit.

Transfer relay 320', upon energizing, at armature 334' opens the circuit of the connecting relay of the second set-up relay group at its resting contact and at its working contact completes a circuit for energizing the connecting relay of the third set-up relay group SUR—3 (not shown); and at armature 335' prepares a circuit for the back space relay of the second relay group SUR—2.

In the same manner as just described the operator presses the remaining keys to complete the word Automatic, thereby successively grounding the conductors of cable 100 in accordance with the above chart to cause the different combinations, corresponding to the keys operated, of set-up relays in successive groups to be energized and locked preparatory to operating the lamp relays.

After typing the word Automatic, the operator operates the space key SP and then types the word Electric, thereby causing the corresponding set-up relays in succeeding groups to be energized and locked in a manner apparent from the foregoing description.

*Carriage return*

The carriage of the Electromatic printer has moved one step in response to each actuation of a key and therefore after printing the character C in its 18th position, the carriage moves towards its 19th position. However, as soon as the carriage moves out of its 18th position, springs CR' (Fig. 4) are automatically operated to momentarily ground conductor 230 and springs 108 (Fig. 3) are also automatically operated to momentarily close an obvious circuit for energizing the carriage-return magnet 106. In response to the operation of magnet 106, the carriage is automatically returned to its normal or first position and the paper in the printer has been advanced one step ready to receive the next line in the well-known manner.

In response to the operation of key CR' and the grounding of conductor 230, a circuit may be traced by way of said conductor, armature 333, armature 310 and its resting contact, and through the winding of relay 301 to battery for energizing the latter. At armature 307 relay 301 prepares a circuit for relay 302 which, however, cannot energize at this time because it is short circuited by ground on both conductors 230 and 233. However, as soon as key CR' is released by the return to normal of the carriage, relay 302 is energized in series with relay 301 by way of conductor 233 and armature 307. Relays 301 and 302 are maintained energized over this circuit until ground is removed from conductor 233 by the deenergization of circuit breaker 218.

Relay 302, upon energizing, at armature 308 disconnects the back-space conductor 231 from the first row of set-up relay groups SUR—1 to SUR—18, inclusive, and connects it to the second row by way of armature 312 and its resting contact; at armature 319 opens a point in the original energizing circuit of relay 301 at its resting contact and at its working contact prepares a circuit for relay 303; and at armature 309 and its working contact closes a circuit for energizing the connecting relay in the first set-up relay group SUR—19 in the second row from grounded conductor 232, armature 309 and its working contact, armature 313 and its resting contact, through the armature and back contact on the transfer relay and through the winding of connecting relay (not shown) to battery. This connecting relay therefore connects the ten conductors of cable 100 to the ten coding relays in the first set-up relay group SUR—19 in the second row in a manner similar to that shown for the first set-up relay group SUR—1 in the first row.

The circuits are now ready to set up the code for the second row of set-up relays and since, in this case, the operator desires to display the word Company in a row provided for eighteen letters, the operator will operate the space key five times and then type the word Company in order to place the word as near as possible in the center of the second row. The relays in the first five groups in the second row are operated in accordance with the space code and the 6th to the 12th groups are operated in accordance with the codes for the word Company. There still remains six groups of set-up relays and the operator may operate the space key six times or may operate the carriage-return key CR' for faster operation.

The operation of the carriage-return key CR' causes the carriage of the printer to return to normal and to move the paper one space for printing the next line and in addition grounds conductor 230. A circuit may now be traced from grounded conductor 230 by way of armature 333, armature 310 and its working contact, armature 333' of the transfer relay of group SUR—19, armature 314 and its resting contact, and through the winding of relay 303 to battery. Relay 303 energizes over the above-traced circuit and at armature 311 prepares a circuit for relay 304, which, however, is short circuited until the carriage-return key CR' is released. When key CR' is released, relay 304 energizes in series with relay 303 and at armature 312 and its working contact transfers the back space conductor 231 to the first set-up relay group SUR—37 in the third row by way of armature 316 and its resting contact; at armature 313 and its working contact completes a circuit for energizing the connecting relay in set-up relay group SUR—37; and at armature 314 opens a point in the original energizing circuit of relay 303 at its resting contact and at its working contact prepares a circuit for relay 305. The circuit for energizing the connecting relay of set-up relay group SUR—37 extends by way of grounded conductor 232, armature 309 and its working contact, armature 313 and its working contact, armature 317, armature and resting contact of transfer relay (not shown) and through the winding of connecting relay (not shown) of group SUR—37 to battery. This relay therefore energizes and connects the set-up coding relays of this group to the conductors in cable 100 in order to receive the codes designating the characters.

The circuits and apparatus are now ready to register the third line to be displayed and in accordance therewith the operator operates the space key SP twice in order to properly space the words on the sign and then types the word Electric, then operates the space key SP again, and then types the word Signs. The successive groups of set-up relays in the third row are operated in a manner similar to that previously described. The operator also presses the carriage-return key CR', causing the carriage to be returned to normal position, the paper to be moved one step, and the relays 305 and 306 to be energized in a manner apparent from the foregoing description.

Reviewing the foregoing, it will be remembered that the words Automatic and Electric have been set up or registered by the set-up relay groups in the first row, that the word Company has been registered by the set-up relay groups in the second row, that the words Electric and Signs have been registered by the set-up relay groups in the third row, and that the carriage of the printer has been returned to its normal position. The operator may now at any time cause the display of the above registrations by simply depressing the display key DIS.

*Set-up wipe-out*

Before describing the operations which take place in response to the operation of the display key, it is believed advisable to describe the operations which take place in case the operator makes an error, which is easily checked by reading the printed type on the paper. For this purpose, it will therefore be assumed that the operator in reading the letters printed on the paper discovers that she has made a mistake and has misspelled one of the words, say for instance the word Company. In order to correct this error it is necessary at this time, since the complete display is registered, to wipe out the entire registration and start over again. The operator, therefore, operates the wipe-out key WO'. In response to the operation of the key WO', ground is disconnected from wiper 214 of switch SS, thereby causing the deenergization of circuit-breaker 218. Circuit breaker 218, upon deenergizing, at contacts 222 removes ground from conductor 233, thereby opening all of the locking circuits of all the operated set-up relays, the transfer relays, and the relays 301 to 306, inclusive. When all of the operated relays have deenergized, the circuit for energizing the connecting relay 322 of the first set-up relay group SUR—1 is re-established over conductor 232 and armatures 308 and 334. The first set-up relay group SUR—1 is therefore ready to receive the first registration in response to the first key operated. It should also be stated that the operator, at any time during registration, can operate the wipe-out key WO' to close a circuit over conductor 103 for energizing the carriage return magnet 106 to cause the carriage of the printer to be returned to its normal position in case it should be in an off-normal position at such a time. The operator now sets up the same registration, or a new one if desired, in the same manner as previously described.

*Error and back space*

The operator notice that at the time of striking a key she has inadvertently struck the wrong key. For example, it will be assumed that the operator struck key Q instead of A and that she immediately noticed such error. The operator will therefore operate the back-space key BS', thereby causing the carriage to be stepped one step back in the usual manner and to operate springs BS' to ground conductor 231. Assuming further that the code of letter Q is registered on the first set-up relay group SUR—1, a circuit may then be traced from grounded conductor 231, armature 308 and its resting contact, armatures and resting contacts on all the transfer relays of the set-up relay groups SUR—18 to SUR—2, inclusive, armature 335 and its working contact, and through the winding of back-space relay 321 to battery. Relay 321, upon energizing, at armature 336 opens the locking circuits of the operated coding set-up relays which deenergize. Transfer relay 320 is maintained energized from battery at armature 336 and grounded conductor 233. When the back-space key is restored, back-space relay 321 deenergizes and removes the battery in the circuit of transfer relay 320, thereby causing the deenergization of the latter relay. At armature 334, transfer relay again completes the circuit for energizing connecting relay 322 to enable the proper registration on the first set-up relay group. The character A may now be registered on the first set-up relay group in the same manner as previously described. It will be noticed that the back-space circuit extends from the last set-up relay group in each row to the first group in such row and therefore the operator may erase any registration on any of the first seventeen groups in each row.

Sequence switch operation

In order to display the registrations on the set-up relays, the operator momentarily operates the display key DIS to ground conductor 104 by way of off-normal springs 105, which are only closed when the carriage is in its normal or first position. A circuit may now be traced by way of conductor 104 for energizing relay 201. Relay 201, upon energizing, at armature 206 and its resting contact disconnects ground from conductor 232 to open the circuit to any connecting relay in case all of the rows of set-up relays are not in use, and at its working contact completes an energizing circuit for stepping relay 203 by way of interrupter springs 210 as well as completing a locking circuit for itself by way of normally closed springs controlled by armature 208. At armature 209, stepping relay 203 completes an obvious circuit for energizing stepping magnet 204 and grounds wiper 211. Magnet 204, upon energizing, positions its pawl preparatory to stepping the wipers 211 to 214, inclusive, and near the end of its stroke operates interrupter springs 210 to open the circuit of relay 203. Relay 203, upon deenergizing, at armature 209 opens the circuit to the stepping magnet 204 with the result that the stepping magnet deenergizes to advance the wipers one step and to close interrupter springs 210. As soon as the wipers move off normal, springs 205 close and cause the energization of relay 202 over an obvious circuit. Relay 202, at armature 208, opens the locking circuit of relay 201 which deenergizes and substitutes the ground at springs 205 for the ground at armature 206 for energizing stepping relay 203. At armature 207, relay 202 prevents the connection of ground to conductor 232 until the wipers of switch SS are returned to normal. Stepping relay 203 and stepping magnet 204 interact in the manner set forth to step the wipers 211 to 214, inclusive, through a complete revolution to normal or the position shown in the drawings.

Upon the first rotary step of the wipers 211 to 214, inclusive, wiper 211 connects ground to conductor 241 extending to the time switch TS in Fig. 11; wiper 212 opens the circuit of circuit breaker 215 which deenergizes and disconnects the commercial power source from conductor 236; and at wipers 213 and 214 maintain the circuit breakers 217 and 218 in energized position because such wipers are bridging wipers and therefore do not open the circuit to these circuit breakers when stepping from one contact to the next. By the removal of the commercial power source from conductor 236, the circuits of all of the lamps in the electric sign are opened, with the result that the display is wiped out. The connection of ground to conductor 241 by way of wiper 211 causes the operation of the numeral magnet of the printer in accordance with the setting of the tens-hour wiper of the time switch, as will be described more fully hereinafter.

Upon the second rotary step of the wipers of the sequence switch SS, wiper 211 connects ground to the hour wiper of the time switch to cause the operation of the numeral magnet in the printer in accordance therewith. Upon the third rotary step, wiper 211 grounds conductor 102 to operate the space magnet 107 to cause the carriage on the printer to operate one space to separate the typing of the hours from the minutes. Upon the fourth rotary step, wiper 211 grounds conductor 243 extending to the tens-minutes wiper of the time switch, and wiper 213 in stepping to a dead contact opens the circuit of circuit breaker 217 which deenergizes and removes ground from lamp relay lock conductor 235 to cause the deenergization of all the lamp relays in the lamp boxes which are locked in operated position. It will be noted that this circuit is opened after the commercial source has been removed from the lamp circuit in order to prevent sparking at the lamp relay contacts. Upon the fifth rotary step, wiper 211 grounds conductor 244 extending to the units-minute wiper of the time switch. Upon the sixth rotary step, wiper 211 grounds space conductor 102 to operate the space magnet 107; wiper 212 closes an obvious circuit for energizing circuit breaker 216; and wiper 213 closes an obvious circuit for energizing circuit breaker 217. Circuit breaker 216, upon energizing, at contacts 220 connects ground to the lamp relay operate conductor 234 to operatively energize all of the lamp relays which have had their circuits prepared by the operation of the set-up relays. Circuit breaker 217, at contacts 221, connects ground to lamp relay lock conductor 235 to maintain energized all of the lamp relays which have just been operated. Wiper 211, upon reaching its seventh bank contact, grounds conductor 245 extending to the tens-seconds wiper of the time switch TS. Wiper 211, upon engaging its eighth bank contact, grounds conductor 246 extending to the units-seconds wiper of the time switch. Wiper 212, upon leaving its seventh bank contact, opens the circuit of circuit breaker 216, which deenergizes and removes ground from lamp relay operate conductor 234; and when the wiper 212 reaches its eighth position it closes a circuit for energizing circuit breaker 216 which at armature 219 connects the commercial power source to conductor 236 for lighting all of the lamps having their circuits completed by the operation of the lamp relays. Wiper 214, upon leaving its seventh bank contact, opens the circuit of circuit breaker 218 which deenergizes and at contacts 222 disconnects ground from set-up relay lock conductor 233 to open the locking circuits of all the energized relays in all the set-up relay groups. Wipers 212 and 213 maintain the circuits closed to circuit breakers 215 and 217 during the remaining stepping operation of the wipers. When wiper 211 reaches its tenth bank contact, said wiper grounds conductor 103 to energize the carriage-return magnet 106 to cause the carriage of the printer to be returned to its normal position and to space the paper therein one step. Wiper 214 in engagement with its tenth bank contact completes a circuit for energizing circuit breaker 218. Circuit breaker 218, upon energizing, at contacts 222 connects ground to set-up relay lock conductor 233 to prepare a locking circuit for the set-up relays which will be operated for the next registration. The wipers of the sequence switch are now returned to their normal position, or the position shown in the drawings, and the off-normal springs 205 are opened. Relay 202 and relay 203 have their circuits opened in response to the opening of off-normal contacts 205, with the result that the circuit for energizing stepping relay 203 is not completed and therefore the wipers remain in the position shown until the display key is again operated. Relay 202, upon deenergizing, at armature 207 completes the previously traced circuit for energizing connecting relay 322 in the first set-up relay group SUR—1.

*Time switch operation*

Before describing the operation which takes place in the lamp panels as a result of the operation of circuit breakers 215 to 218, inclusive, a description will first be given of how the stepping operation of wiper 211 controls the printer by means of the time switch TS to print the time of day the display key has been operated.

Referring now to the time switch TS shown in Fig. 11, a clock operates springs 901 every five seconds to energize motor magnet 911 of the seconds switch over an obvious circuit. Since the contacts 901 are closed and opened every five seconds, the motor magnet 911 energizes and deenergizes in accordance therewith to step the wipers 902 to 904, inclusive, one step for each deenergization of motor magnet 911. The wipers 902 to 904, inclusive, are therefore stepped in the direction of the arrow one step every five seconds. Every fifty-five seconds or whenever wiper 902 engages its twelfth or twenty-fourth bank contact a circuit is closed over grounded wiper 902 for energizing the motor magnet 912 of the units-minutes switch. Motor magnet 912, upon energizing, positions its pawl preparatory to stepping the wipers 905 and 906. When wiper 902 takes its sixth step, the circuit to motor magnet 912 is opened, with the result that the motor magnet deenergizes and advances its wipers 905 and 906 one rotary step in the direction indicated by the arrow. When the wiper 902 of the seconds switch reaches its twenty-fifth bank contact, a circuit may be traced from grounded wiper 902 by way of the twenty-fifth bank contact, interrupter springs of motor magnet 911 and through the winding of said magnet to battery. Motor magnet 911 thereupon energizes and immediately deenergizes, thereby causing the wipers 902 to 904, inclusive, to take one step independent of the ground connections from the clock. From the foregoing, it will be seen that the units-minutes switch is operated every sixty seconds by the seconds switch and, when wiper 905 of the units-minutes switch reaches its tenth position, wiper 905 closes an obvious circuit for energizing relay 915. Relay 915, upon energizing, at armature 921 closes a circuit by way of grounded wiper 905 for energizing slow-to-release relay 916. Relay 916, upon energizing, at armature 922 prepares a circuit for energizing the motor magnet 913 of the tens-minute switch. As soon as the wiper 905 of the units-minute switch is rotated off of its tenth bank contact, the circuit of relays 915 and 916 are opened, with the result that a circuit is momentarily closed from ground by way of armature 920, armature 922, and through the winding of motor magnet 913 to battery. Motor magnet 913 is maintained energized until the slow-to-release relay 916 deenergizes and said magnet thereupon operates its wipers 907 and 908 one rotary step. From the foregoing it therefore can be seen that for every ten steps of the units-minute switch the tens-minute switch is operated one step.

Whenever wiper 907 of the tens-minute switch reaches its sixth, twelfth, eighteenth, or twenty-fourth bank contact, a circuit may be traced by way of grounded wiper 907 and said contacts through the winding of relay 917 to battery. Relay 917, upon energizing, at armature 924 completes a circuit for energizing slow-to-release relay 918 by way of grounded wiper 907. Relay 918, upon energizing, at armature 925 prepares a circuit for operating motor magnet 914 of the hour switch. As soon as the wiper 907 of the tens-minute switch steps off of its sixth, twelfth, eighteenth, or twenty-fourth contact, the circuits of relays 917 and 918 are opened, with the result that relay 917 deenergizes before slow-to-release relay 918 and completes a circuit by way of armatures 923 and 925 for energizing the motor magnet 914 of the hour switch. Since this circuit is only momentarily closed, due to the slow action of relay 918, the motor magnet 914 of the hour switch deenergizes to step the wipers 910 and 909 one step. When wiper 907 reaches its 25th bank contact a circuit is automatically closed over the interrupter springs of motor magnet 913 to cause the motor magnet to be energized independent of the units-minute switch, thereby causing the wipers 907 and 908 to be automatically stepped to their first bank contacts. From the foregoing it will therefore be seen that the tens-minute switch at every hour or every sixty minutes causes the hour switch to advance one step. When the wipers 910 and 909 are in engagement with their twenty-fifth bank contacts, the springs 919 are closed to energize motor magnet 914 through its own interrupter springs, thereby causing the magnet to energize and deenergize to advance the wipers another step independent of the tens-minute switch. From the foregoing it will therefore be seen that all of the wipers of the various switches in the time switch are in engagement with their respective bank contacts which correspond to the time of day. It will now be assumed that the display key was operated at five seconds after 9:55 P. M., and therefore the wipers of the hour switch are in engagement with their twenty-first bank contacts; the wipers of the tens-minute switch are in engagement with their sixth bank contacts; the wipers of the units-minute switch are also in engagement with their sixth bank contacts; and the wipers of the second switch will be in engagement with their respective second bank contacts. When wiper 211 grounds conductor 241 as previously described, a circuit may be traced for energizing the No. 2 numeral magnet of the printer in Fig. 3 as follows: From grounded wiper 211, conductor 241, included in cable 237, wiper 910 in engagement with its twenty-first bank contact, over the multiple connected contacts to the No. 2 conductor included in cable 101, and then through the winding of numeral magnet No. 2 (Fig. 3) to battery. Numeral magnet No. 2, upon energizing over the above-traced circuit, causes the printer to type the digit 2 on the paper and causes the carriage to move one step in the well-known manner. In a similar manner, when conductor 242 is grounded by wiper 211, a circuit may be traced through wiper 909 in engagement with its twenty-first bank contact and over the No. 1 conductor, included in cable 101, and through the winding of numeral magnet No. 1 to battery. Magnet No. 1, upon energizing, causes the printer to print the digit 1 and advance the carriage an additional step. The wiper 211 next grounds conductor 102 to energize space magnet 107 over conductor 102 to cause the carriage of the printer to be advanced one step without printing in the well-known manner. When wiper 211 grounds conductor 243, a circuit extends by way of wiper 908 in engagement with its sixth bank contact, conductor 5 included in cable 101, and through the winding of numeral magnet 5 to battery. Magnet 5, upon energizing over the above-traced circuit, causes the printer to print the digit 5 and to advance the carriage another step. When wiper 211 grounds conductor 244, a circuit for again energizing numeral magnet 5 may be traced by way of wiper 908 in engagement with its sixth bank contact and conductor 5 included in cable 101. Magnet 5 again causes the printer to print the digit 5 and to advance the carriage another step. Upon the sixth step of wiper 211, said wiper again completes the circuit for energizing the space magnet 107 over conductor 102 and the carriage of the printer is advanced another step. When wiper 211 grounds conductor 245, a circuit may be traced by way of wiper 903 in engagement with its second bank contact, through the "0" or zero conductor included in cable 101, and through the winding of "0" magnet to battery. Zero magnet is energized over this circuit and operates the printer to print the digit 0 as well as to advance the carriage another step. When wiper 211 grounds conductor 246, a circuit may be traced by way of wiper 904 in engagement with its second bank contact and by way of conductor No. 5, included in cable 101, and through the winding of magnet 5 to battery. The magnet 5 is again energized to cause the printer to print the digit 5 and to advance the carriage another step. Shortly after this, the wiper 211 grounds the carriage-return conductor 103 to energize the carriage-return magnet 106 to cause the carriage to be returned to its normal position and to advance the paper in the printer in the well-known manner. From the foregoing it will therefore be seen that the printer has printed the digits 21, has left a space, and has then printed digits 55, left a space, and then printed the digits 0 and 5. The time printed on the paper indicates five seconds after 9:55 P. M., and also indicates the moment at which the display is flashed on the lamp panel.

*Display*

A description will now be given of the various operations which take place in response to the operation of the circuit breakers in Fig. 4 due to the operation of the sequence switch SS. Circuit breaker 215 is deenergized in response to wiper 212 stepping to its first position, and said circuit breaker at contacts 219 disconnects the commercial power source from common conductor 236 which extends to all the lamps in all the lamp boxes, thereby extinguishing any lamp which may have been illuminated. When circuit breaker 217 deenergizes in response to wiper 213 reaching its fourth bank contact, ground is removed from conductor 235 by the operation of contacts 221. In response to the removal of ground from lamp relay lock conductor 235, all of the lamp relays in all of the lamp boxes or panels which have been maintained in energized position thereover are now restored to their normal positions, or the positions shown in Figs. 6 to 10, inclusive. When wipers 212 and 213 are rotated into engagement with their sixth bank contacts, circuit breaker 216 energizes and connects ground to lamp relay operate conductor 234, and circuit breaker 217 again grounds conductor 235 to lock up any of the character relays in the lamp boxes which may at such time be energized.

When ground is connected to conductor 234, a circuit may be traced through each operated set-up relay group for operating the character relay corresponding to the character key actuated. As an example, when the character key A was the first character key actuated, then set-up relays 341 and 342 in the first set-up relay group SUR—1 are in energized position. A circuit may now be traced by way of grounded conductor 234, armature 350, armature 351, over the A conductor included in cable 400, and through the lower winding of relay A in Fig. 6 to battery. Relay A, upon energizing, at armature 409 completes a locking circuit through its upper winding from grounded lamp relay lock conductor 235; and at armature 408 completes a circuit for energizing relay A' by way of grounded conductor 235. At armature 401, relay A closes a circuit from ground through the lamp 15 to conductor 236 connected to the commercial power source for causing the illumination of lamp 15; at armature 402 and its resting contact opens the circuit extending to lamps 2 and 6 and at its working contact closes a circuit for illuminating lamps 3, 4, and 5 as follows: From ground by way of the working contact of armature 402 and said armature, to junction point 719 where the circuit divides, one branch going by way of armature 825 and its resting contact to lamp 5 and conductor 236, the other branch extending by way of the resting contact of armature 718 and said armature, to junction point 522 from whence the circuit extends to lamp 3 to conductor 236, and the other branch by way of resting contact of armature 521 and said armature to lamp 4 and conductor 236. At armature 403 relay A closes a circuit through the lamp 22 to conductor 236 for illuminating said lamp; at armature 404 and its resting contact relay A breaks the circuit of lamp 24 and at its working contact closes a circuit for illuminating the lamp 16 by way of resting contact of armature 826 and said armature and through the lamp 16 to conductor 236. At armature 405 relay A completes a circuit from ground through the lamp 21 to conductor 236; at armature 406 completes an obvious circuit for illuminating the lamp 11; and at armature 407 completes a similar circuit for illuminating the lamp 10 by way of conductor 236. Relay A' at armature 410 connects ground to lamp 52 to illuminate lamp 52 by way of conductor 236. At armature 411 relay A' opens the circuit extending to lamps 12 and 8 at its resting contact and at its working contact completes a circuit for illuminating lamp 45 by way of resting contact of armature 523 to conductor 236 and the circuit for illuminating lamp 39 by way of armature 827 and its resting contact, armature 721 and its resting contact, armature 621 and its resting contact, armature 720 and through lamp 39 to conductor 236. At armature 412 relay A' closes an obvious circuit for lamp 47 and completes the circuit for lamp 42 by way of armature 423 and its resting contact; and at armature 413 closes an obvious circuit for illuminating the lamp 58. At armature 414 relay A' connects the grounded conductor 235 to conductor 467 for energizing the hyphen relay shown at the extreme right of Fig. 10. Hyphen relay energizes over its lower winding and at armature 815 completes a locking circuit for itself by way of grounded conductor 235 and its upper winding. The hyphen relay, upon energizing, at armature 816 completes a circuit for illuminating the lamp 32 (Fig. 6) and at armature 817 completes a circuit for illuminating the lamps 28, 29, and 31 by way of conductor 236. The circuit for lamp 29 extends by way of the resting contact of armature 822 and said armature; the circuit for lamp 28 extends by way of armature 717 and its resting contact; and the circuit for lamp 31 extends by way of armature 520 and its resting contact, armature 823 and its resting contact, resting contact of armature 824 and said armature, resting contact of armature 452 and said armature, and through the lamp 31 to conductor 236. At armatures 819, 820, and 821 the hyphen relay completes circuits for illuminating lamps 30, 33, and 27, respectively, by way of common conductor 236. Referring now to the chart shown in Fig. 18 and to the second vertical column under the A character, it will be seen that when the character key A is operated, the circuit of lamp 2 is opened as indicated by the zero in the second vertical column opposite the lamp 2, while the lamps 3, 4, and 5 are illuminated as indicated by the crosses or X's in the second vertical column opposite the lamps 3, 4, and 5. In a similar manner, reading from top to bottom, it will be seen that the circuit of lamp 6 is opened, that the circuits of lamps 10 and 11 are closed, that the circuits of lamps 12 and 18 are opened, while the circuits of lamps 39 and 45 are closed; that the lamps 15 and 16 are closed while the circuit of lamp 24 is opened; and that the circuits of lamps 21, 22, 27, 28, 29, 30, 31, 32, 33, 42, 47, 52, and 58 are closed. The chart, Fig. 18, therefore provides a ready chart for indicating which lamps are illuminated in response to the actuation of the corresponding character keys. While the Figs. 6 to 10, inclusive, show only the detail circuits for one lamp box, it will be understood that the circuits for each of the lamp boxes are identical and therefore need not be shown.

Since the character key U was the second character key actuated, then the third and tenth coding relays in the second set-up relay group SUR—2 are in energized position. Since these relays correspond to relays 343 and 346, respectively, shown in group SUR—1, a circuit may therefore be traced via the second set-up relay group SUR—2 by way of grounded conductor 234 and through armatures similar to armatures 355 and 356 to the U conductor extending to relay U in the second lamp box. Relay U in the second lamp box is energized over its lower winding and at armature 614 completes a locking circuit for itself through its upper winding to grounded conductor 235. At armature 613 relay U connects grounded conductor 235 by way of conductor 503 through the upper winding of the J relay to energize the latter relay. Relay J at armature 506 completes a locking circuit for itself through its upper winding to grounded conductor 235. From the foregoing it will be seen that whenever the key U is depressed both the U relay and the J relay energize to close circuits for illuminating the lamps which form the letter U. Relay U, upon energizing, at armature 622 completes a circuit for illuminating the lamps 12, 18, and 39; and at armature 624 completes a circuit for illuminating the lamp 27. Relay J, upon energizing, at armature 524 completes a circuit for illuminating the lamp 33; at armature 525 completes a circuit for illuminating lamp 50; at armature 526 completes a circuit for illuminating the lamps 14 and 20; at armature 527 completes a circuit for illuminating lamp 7; at armature 528 completes a circuit for illuminating lamps 53, 54, 55, 56, and 57; at armature 529 completes a circuit for illuminating lamp 45; at armature 530 completes a circuit for illuminating lamps 42 and 47; and at armature 531 completes a circuit for illuminating lamp 51. Referring now to the chart shown in Fig. 18, it will be seen that all of the lamps above mentioned have crosses or X's in the vertical column below the character U, thereby indicating that such lamps are illuminated when the character key U has been operated. From the foregoing description and with the aid of the chart shown in Fig. 18 and the circuits shown in Fig. 6 to Fig. 10, inclusive, it is believed that it will be unnecessary to trace the circuits for illuminating the lamps of each character, as the same are readily ascertained from the chart and circuits shown. From the foregoing description, it can also be seen how the character relay A, upon energizing, also causes the operation of relay A' and the hyphen relay in order to illuminate the required number of lamps. It should be noted that the hyphen relay completes circuits for illuminating lamps 27 to 33, inclusive, which extend in a horizontal line across the middle of the lamp box. Since certain letters and figures have somewhat similar forms, certain groups of relays are therefore included in a number of different characters. For instance, the hyphen including the above-mentioned lamps is included in the character A, the character H, and numeral 4. Referring to Fig. 17, it will be noted that the A' relay, upon energizing, caused the illuminations of lamps 39, 45, 52, 42, 47, and 58 to form the bottom legs of the character A. Since these lamps are also used in the formation of letter H, it will be seen that the relay H in Fig. 6 completes a circuit for energizing A' relay by way of armature 460. It should also be noted that in forming the letter U on the lamp box, the letter J was first formed by the operation of relay J and the relay U is operated to complete the letter U by illuminating lamps 1, 12, 18, 27, and 39. Another combination of lamps controlled by relay C' and used quite extensively are the lamps 8, 2, 3, 4, 5, 6 and 9 and lamps 50, 53, 54, 55, 56, 57, and 51. This combination of lamps is used to form the letters C, G, O, Q, S, 3, 6, 8, 9, and .$. The relay C' is therefore energized over conductor 466 whenever relays G, S, or C are energized. Another combination of lamps comprising lamps 12, 18, 27, 39, 45, 14, and 47 is used in forming the characters C, G, and O and therefore relay C is energized over conductor 464 whenever the C or O relays are energized. The first vertical row of lamps comprising lamps 1, 12, 18, 27, 39, 45, and 52 are used in forming the letters P, M, L, K, F, E, D, B, R, and W. This group of lamps is controlled by the P' relay shown in Fig. 7 and such relay is energized over conductor 462 whenever the E, the F, the K, the L, the M', and the P relays are operated. Relay P directly controls the circuit of lamps 2, 3, 4, 5, 6, 9, 14, 20, 26, 32, 31, 30, 29, and 28 and causes the energization of relay P' at armature 518 to cause the relay P' to energize and complete the first vertical row of lamps in order to complete the letter P. The group of lamps directly controlled by relay P are also used in forming the characters B and R and therefore the relay P is energized over conductor 465 whenever relays B and R are energized. It should also be noted that whenever relay E is operated, said relay operates relays F and L and both the F and L relays operate the relay P'. It will be noted that the relay E itself does not close any lamp circuit but controls the operation of the F and L relays and that the L relay controls the operation of the P' relay. There are further combinations of lamps such as the combinations controlled directly by the armatures operated by relay S, and this particular combination of lamps is used in forming the characters S, 6, 8, 9, and $. There are numerous other combinations of lamps which are used in various combinations to form the various characters as will be apparent from the detail lamp and relay circuits shown in Figs. 6 to 10, inclusive.

In those set-up relay groups in which the first and sixth coding relays corresponding to relays 341 and 346 have been operated in response to the operation of a space key SP, it will be seen that no circuits are completed over the conductors in cable 400 for operating any of the lamp relays in the lamp boxes. Since none of the relays in such lamp boxes are operated, all of the lamps therein therefore remain dark.

When the sequence switch SS, Fig. 4, operates its wiper 212 into engagement with its eighth bank contact, circuit breaker 216 deenergizes and at contacts 220 disconnects ground from the lamp relay operate conductor 234 and completes an obvious energizing circuit for circuit breaker 215 which at contacts 219 connects the commercial power source over common conductor 236 to all of the lamps in all of the lamp boxes. All of the lamps having their circuits closed at this time will therefore be illuminated. When wiper 214 is operated into engagement with its eighth blank contact, circuit breaker 218 deenergizes and at contacts 222 disconnects ground from set-up relay lock conductor 233 with the result that all of the set-up relays, transfer relays, and relays such as 301 to 306, inclusive, are deenergized. When wiper 214 reaches its tenth bank contact, the circuit of circuit breaker 218 is again established with the result that circuit breaker 218 energizes and at contacts 222 again grounds the set-up relay lock conductor 233 to prepare a locking circuit for the set-up relays and associated relays shown in Fig. 5. When the sequence switch is returned to its normal position, the connecting relay 322 in the first set-up relay group SUR—1 is completed in the same manner as previously described, and the operator can now operate the keys of the printer in accordance with the next display. From the foregoing description it can readily be seen that the lamps in the first horizontal row of lamp boxes are illuminated to spell the words Automatic and Electric; that the lamps in the second horizontal row are illuminated to spell the word Company; and that the lamps in the third horizontal row are illuminated to spell the words Electric and Signs in response to the operation of the display key and the sequence switch SS shown in Fig. 4. This display will remain on the sign during the time the operator is setting up a new display and will be erased from the sign in response to a subsequent operation of the display key DIS and the sequence switch SS.

*Remote operation*

All the foregoing detailed description has described the operations which take place when the printer is located near the electric sign. In some instances it may be desirable to operate the electric sign from a remote point and therefore some means must be provided to cut down the number of conductors between the printer and the sign so as to reduce the cost of such installation. Figs. 12 and 13 show an arrangement for controlling the operation of the electric sign over a two-conductor trunk with the printer located at a point remote from the sign. In describing this operation, Figs. 12 and 13 are substituted for Fig. 4 and the keys WO, BS, and CR shown in the dotted rectangle in Fig. 3 are substituted for the keys WO', BS' and CR' shown in the dotted rectangle in Fig. 4. The cable 100 in Fig. 3 instead of being multipled to all of the set-up relay groups extends to cable 100' in Fig. 12 and the individual conductors therein terminate in the transfer relays TR. The equipment shown in Fig. 12 is associated with the printer at the remote point while the conductors 1015 and 1014 are a cable pair extending to the apparatus shown in Fig. 13 which is associated with the set-up relay groups at a point near the electric sign. The ten conductor cable 100'' extends to the conductor 100 shown in Fig. 5 which is multipled to all of the set-up relay groups.

The operation of the printer by the operator is the same as previously described with the exception that the operator cannot operate a succeeding key until the solenoid magnet 1030 is energized over the circuit extending to the normal position contact and wiper 1012. Magnet 1030, upon energizing, operates the bar 1031 to the right to position the slots, such as slot 1033, directly below the pins, such as pin 1034 on character key B, to permit operation of any key. When character key A is operated, conductors 1 and 2 in cables 100 and 100' are grounded to cause the energization of relays 1 and 2 in the transfer relay group TR, Fig. 12. At armatures 1021 and 1022, relays 1 and 2 prepare a circuit for energizing relay 1002, but the latter relay cannot energize at this time because of the short circuit around its winding extending from the grounded conductors 1 and 2 and from ground by way of the normally closed springs controlled by armature 1008. When the key A is released and ground is removed from conductors 1 and 2, the short circuit around relay 1002 is removed, with the result that relay 1002 energizes over the following circuit: From ground by way of the normally closed springs controlled by armature 1008, the winding of relay 1002, conductor 1001, and through armatures 1021 and 1022 and the windings of relays 1 and 2 to battery. Relays 1, 2, and 1002, are maintained energized over this circuit after the release of key A. Relay 1002 at armature 1006 completes a circuit for energizing relays 1004 and 1102 as follows: From ground by way of armature 1006, normally closed springs controlled by armature 1007, interrupter springs 1011, through the winding of relay 1004 over the trunk conductor 1015 and through the winding of relay 1102 to battery. As indicated, relay 1004 is provided with a copper slug on its armature end to make the relay somewhat slow to energize and so that it will energize and deenergize in synchronism with relay 1102 of Fig. 13. Due to the length of conductor 1015, relay 1102 will have an appreciable lag in operation and therefore the copper slug on relay 1004 has been added to compensate for this lag. At armature 1010 relay 1004 closes an obvious circuit for energizing the stepping magnet 1005 to cause the stepping magnet to position its pawl preparatory to stepping the wipers of the distributor D. In the distributor D', relay 1102 at armature 1106 opens a point in the self-restoring circuit of the distributor D' at its resting contact and at its working contact closes an obvious circuit for energizing the slow-to-release relay 1103 and stepping magnet 1105. Stepping magnet 1105 energizes and positions its pawl preparatory to stepping the wipers of the distributor D'. Relay 1103, upon energizing, at armature 1107 opens a further point in the self-restoring circuit of distributor D'; at armature 1108 and its working contact grounds conductor 1101 to prepare a circuit for locking any energized pick-up relay; and at armature 1109 completes a circuit for energizing slow-to-release relay 1104. Relay 1104, upon energizing, at armature 1114 prepares a circuit for momentarily grounding the conductor 1116; and at armature 1115 connects ground to the locking conductor 1101.

Stepping magnet 1005 of the distributor D, upon energizing and near the end of its stroke, operates its interrupter springs 1011 to open the energizing circuit of relays 1004 and 1102. Relays 1004 and 1102 thereupon simultaneously deenergize and simultaneously open the circuits extending to their respective stepping magnets to cause such stepping magnets to deenergize and step their respective wipers one step. Stepping magnet 1005, upon deenergizing, again closes a circuit for energizing relays 1004 and 1102 at interrupter springs 1011, with the result that the relays are again simultaneously energized. As indicated, relay 1103 has a copper slug on its heel end with the result that this relay is slow to release and therefore will not deenergize during the intermittent operation of relay 1102. As soon as wiper 1012 steps out of its normal position, the circuit to magnet 1030 is opened and said magnet deenergizes. Spring 1032 thereupon draws the bar 1031 to the left so that the slots, such as slot 1033, are no longer directly below the pins on the character keys, such as pin 1034 on key B. With the bar 1031 drawn to the left, none of the character keys can be operated because the pins will strike the upper edge of bar 1031, thereby preventing their operation. When wiper 1012 reaches its first bank contact, a circuit may be traced from ground wiper 1012 in engagement with its first bank contact, through the multiple connected bank contacts and through the upper winding of relay 1003 to battery. Relay 1003 energizes over the above-traced circuit and at armature 1007 substitutes the ground on wiper 1012 for the ground at armature 1006, to again simultaneously energize relays 1004 and 1102; at armature 1008 and its working contact substitutes the ground on wiper 1012 for the ground disconnected at the normally closed springs controlled by this armature, and at armature 1009 completes an obvious locking circuit through its lower winding from ground at armature 1006. Relays 1004 and 1102 are energized in series from ground extending by way of wiper 1012, armature 1007 and its working contact, interrupter springs 1011, winding of relay 1004, conductor 1015, and through the winding of relay 1102 to battery. Relay 1004 again energizes stepping magnet 1005 and relay 1102 again energizes stepping magnet 1105. The circuit for relay 1103 is again closed before such relay has had time to deenergize. Stepping magnet 1005 again opens the circuit of relays 1004 and 1102 and said relays and stepping magnets interact in the manner just described to automatically step the wipers of the distributors D and D' through a complete cycle or until such time as the wiper 1012 of distributor D is rotated out of engagement with the multiple connected contacts and into engagement with its normal position bank contact where it completes a circuit for energizing the solenoid magnet 1030 which draws the bar 1031 to the right so that the slots are directly below the pins on the keys. Since the stepping magnets 1005 and 1105 operate in synchronism as just described, the wiper 1013 of distributor D and wiper 1113 of distributor D' are also operated in synchronism to engage correspondingly numbered conductors terminating in their bank contacts. Since relays 1 and 2 in the transfer relay group TR, Fig. 12, were energized in response to the operation of character key A, the armature 1031 connects ground to conductor 1 terminating in the first bank contact accessible to wiper 1013 and the armature 1032 grounds conductor 2 terminating in the second bank contact accessible to wiper 1013. When the wipers 1013 and 1113 simultaneously engage their first bank contacts, a circuit may be traced by way of grounded armature 1031, conductor 1, first bank contact and wiper 1013 of distributor D, conductor 1014, wiper 1113 in engagement with its first bank contact, and through the winding of No. 1 pick-up relay to battery. Pick-up relay 1, upon energizing, at armature 1121 completes a locking circuit for itself to grounded conductor 1101 and at armature 1131 prepares a circuit for momentarily grounding No. 1 conductor included in cable 100''. When the wipers 1013 and 1113 are simultaneously operated into engagement with their second bank contacts, a circuit may be traced from grounded armature 1032, conductor 2 terminating in the second bank contact accessible to wiper 1013, conductor 1014, wiper 1113 in engagement with its second bank contact, conductor 2, and through the winding of No. 2 pick-up relay to battery. Pick-up relay 2, upon energizing, at armature 1122 completes a locking circuit from grounded locking conductor 1101 for maintaining itself in energized position and at armature 1132 prepares a circuit for momentarily grounding conductor 2 included in cable 100″. At armature 1151 relay 2 opens a point in the circuit extending to conductor 7 of cable 100″ for a purpose to be more fully described hereinafter. Since only relays 1 and 2 of the transfer relays TR were operated, the wipers 1013 and 1113 rotate over their remaining bank contacts and back to their normal position, or the position shown in the drawings, without completing any other circuit.

When wiper 1012 returns to its normal position, the circuit for energizing relays 1004 and 1102 is interrupted and said relays therefore do not again energize when the stepping magnet 1005 closes its interrupter springs 1011. The holding circuit of transfer relays 1 and 2 and relay 1002 is also interrupted when wiper 1012 reaches its normal position with the result that relays 1 and 2 and 1002 now deenergize. Relays 1 and 2 at armatures 1021 and 1022 open a further point in their locking circuits and at armatures 1031 and 1032 disconnect ground from conductors 1 and 2 terminating in the first and second bank contacts accessible to wiper 1013. Relay 1002, upon deenergizing, at armature 1006 opens the locking circuit extending through the lower winding of relay 1003 with the result that relay 1003 deenergizes and restores its armature to normal position, or the position shown in the drawings. Since relay 1102 does not again energize, slow-release relay 1103, after an interval, deenergizes. At armature 1107 relay 1103 completes a circuit for returning the wipers of distributor D′ to normal position in case wiper 1112 is in engagement with any of the multiple connected contacts; at armature 1108 completes a circuit for momentarily grounding conductor 1116; and at armature 1109 opens the circuit of slow-to-release relay 1104. After an interval of time for which it is adjusted, relay 1104 deenergizes and at armature 1115 removes ground from locking conductor 1101 to cause the deenergization of pick-up relays 1 and 2. At armature 1114 relay 1104 removes ground from conductor 1116 for a purpose to be described later.

When ground is momentarily connected to conductor 1116 by the deenergization of relay 1103 and the subsequent deenergization of relay 1104, a circuit may be traced from grounded conductor 1116 by way of armature 1131 and armature 1132, conductors 1 and 2 included in cable 100″ to conductors 1 and 2 included in cable 100, armatures 337 and 338 of connecting relay 322 and through the windings of relays 341 and 342 to battery. The operation of the relays and apparatus shown in Fig. 5 is now the same as previously described, and therefore when the ground is removed from conductor 1116 by the deenergization of relay 1104 transfer relay 320 in the set-up relay group SUR—1 is energized in series with the relays 341 and 342 in the same manner as previously described. Only in this case the circuit extends by way of conductor 233 and 233′ to contacts 222′ of circuit breaker 218′ which corresponds to the circuit breaker 218 of Fig. 4.

In response to the operation of the second character key, in this case character key U, conductors B and O are grounded. Transfer relays 3 and 0 of Fig. 12 are thereupon energized and when the key is released relay 1002 is energized in the same manner as previously described to cause the distributors D and D′ to operate in synchronism as previously described. In this case wiper 1013 encounters ground on its third and tenth bank contacts with the result that circuits are completed over conductor 1014 and wiper 1113 for energizing the No. 3 and 0 pick-up relays in Fig. 13. By the operation of the No. 3 and 0 pick-up relays and the operation of the distributor D′, ground is momentarily connected to the 3 and 0 conductors of cable 100 for energizing the third and tenth coding relays in the second set-up relay group SUR—2 in a manner similar to that previously described. In a similar manner the transfer relays TR, the distributors D and D′, and the pick-up relays PUR are operated in response to each actuation of a character key to cause the operation of the set-up relays to register that character.

The operation of the back space key BS, Fig. 13, grounds conductors 2 and 7, thereby causing relays 2 and 7 of the transfer relay group TR to be energized. When the key is released, the distributors D and D′ are operated to energize the No. 2 and 7 pick-up relays in Fig. 13. When the relays 2 and 7 in the pick-up relay group PUR in Fig. 13 are energized, a circuit may be traced from grounded armature 1142, armature 1147, conductor 231′ now connected to conductor 231 in Fig. 5, and thence over the previously traced circuit to the back-space relay such as relay 321 to battery. The back-space relay, such as back-space relay 321, is energized over the above-traced circuit. Referring to Fig. 13, it will be seen that the No. 2 pick-up relay at armature 1151 opens the circuit extending to the No. 7 conductor included in cable 100″ whenever the combination of the two relays Nos. 2 and 7 in the pick-up relay group are simultaneously energized. In a similar manner, it will be seen that at armature 1150 relay 7 of the pick-up relay group prevents the connection of ground to conductor 2. Therefore, whenever relays 2 and 7 are energized in combination, no circuits are completed over the conductors 2 and 7 for operating the set-up relays. When relays 2 and 7 deenergize in response to the distributor D′ returning to its normal position, ground is removed from the energizing circuit of the back-space relay with the result that the back-space relay deenergizes to cause the deenergization of the associated transfer relay in the same manner as previously described. When this transfer relay deenergizes, the associated connecting relay is energized to connect the conductors of cable 100 to the coding set-up relays in the same manner as previously described.

In case the operator has set up only a portion of the set-up relay group in one row and then wishes to skip the remaining portion in such row and then start in the next succeeding row, the operator will therefore operate the carriage-return key CR to ground conductors 3 and 8 included in cable 100. The No. 3 and 8 relays included in the transfer relay group TR in Fig. 12 are energized over conductors 3 and 8 of cable 100′ and at armatures 1033 an 1038 ground the third and eighth bank contacts accessible to wiper 1013. By the operation of the carriage-return key the carriage of the printer is automatically returned to its normal position and advances the paper in the printer one step in the customary manner. When the key CR is released, ground is removed from the No. 3 and 8 conductors with the result that the relay 1002 energizes in series with the relays 3 and 8 in a manner similar to that previously described. The distributors D and D' are operated through a complete cycle in response to the operation of relay 1002 and when the wipers 1013 and 1113 simultaneously engage their third bank contacts the No. 3 relay of the pick-up relay group in Fig. 13 is energized and in a similar manner when the wipers reach their eighth bank contact the No. 8 relay of the pick-up relay of the pick-up relay group is likewise energized. As soon as the No. 8 pick-up relay is energized, a circuit may be traced from grounded armature 1143, armature 1148 to carriage-return conductor 230' which is at this time connected to carriage-return conductor 230 in Fig. 5 with the result that the row-space relay, such as 301, 303, or 305, as the case may be, is energized, and when ground is removed from conductor 230' and 230 the relay, such as relay 302, 304, or 306, is energized to cause the energization of the connecting relay in the first set-up relay group in the next row of set-up relay groups in the same manner as previously described.

In case the operator has made an error in operating the various keys and desires to wipe out the entire registration at this time set up on the set-up relay group, the operator will operate the wipe-out key WO and in so doing will ground conductors 4 and 9 included in cable 100. In response to the operation of the wipe-out key WO a circuit is completed through the outer left-hand springs for energizing the carriage-return magnet 106, whereupon the carriage is returned to its normal position in the usual manner. When conductors 4 and 9 of cable 100 are grounded, relays 4 and 9 of the transfer relay group TR are energized over conductors 4 and 9 included in cable 100', and when the wipe-out key is released the relay 1002 is energized in series with the transfer relays in the same manner as previously described. The distributors D and D' again operate their wipers through a complete cycle and wiper 1013, upon reaching its fourth bank contact, encounters ground connected thereto by way of armature 1034 and upon reaching its ninth bank contact encounters ground connected thereto by way of armature 1039. Since the wiper 1113 operates in synchronism with wiper 1013, the wiper 1113 will be in engagement with its fourth bank contact at the time wiper 1013 is in engagement with its fourth bank contact, with the result that the No. 4 pick-up relay group in Fig. 13 is energized over conductor 1014 and grounded armature 1034 and in a similar manner the No. 9 pick-up relay is likewise energized over conductor 1014 when the wipers 1013 and 1113 engage their ninth bank contacts. Pick-up relay 9, upon energizing, at armature 1149 completes a circuit from grounded armature 1144 for energizing the wipe-out relay 1145. Wipe-out relay 1145, upon energizing, at armature 1146 disconnects ground from wiper 214', with the result that the circuit breaker 218' deenergizes and at contacts 222' disconnects ground from the set-up relay lock conductor 233', which is connected to conductor 233 at this time, to cause the deenergization of all the relays in or associated with the set-up relay group. This operation is therefore the same as that described in connection with the release of the circuit breaker 218 in Fig. 4.

Assume now that the operator has registered the words Automatic and Electric in the first row of set-up relay groups, the word Company in the second row of set-up relays, and the words Electric and Signs in the third row of set-up relay groups. After completing this registration, the operator may at any time operate the display key to erase the display which is illuminated and to cause the display of the registrations which have just been completed on the set-up relay groups. In response to the operation of the display key DIS, a circuit may be traced from ground at the display key, by way of off-normal springs 105, conductor 104, conductor 104', to junction point 1050 where the circuit divides, one branch extending through the winding of relay 201 to battery; and the other branch extending over a continuation of conductor 104' to the normal position bank contact accessible to wiper 1013 and such wiper, conductor 1014, wiper 1113 in engagement with its normal position bank contact, and through the winding of relay 201'' to battery. Relay 201' and 201'' energize over the above-traced circuit to start the operation of the sequence switches SS' and SS². The sequence switches SS' and SS² shown in Figs. 12 and 13 are similar to the sequence switch SS shown in Fig. 4 and perform similar functions. That is, the sequence switch SS' in Fig. 12 rotates its wiper 211' to perform the same functions as are performed by wiper 211 of the sequence switch SS shown in Fig. 4. The sequence SS² rotates its wipers 212', 213' and 214' to control the operation of the circuit breakers 215', 216', 217', and 218' in the same manner as the wipers of the sequence switch SS in Fig. 4 control the circuits of the circuit breakers 215, 216, 217, and 218 in Fig. 4. From the foregoing description, it will be understood, therefore, that the wiper 211' of sequence switch SS' causes the printer to print the time of day the last registered display was flashed on the sign while the operation of the circuit breakers in Fig. 13 causes the previous display to be extinguished, causes the release of the operated lamp relays, then causes the lamp relays to operate in accordance with the operated set-up relays, connects the commercial power source to the lamps in all the lamp panels, opens the circuit to the operated set-up relays to cause their deenergization and then prepares the set-up relay group to receive the next registration in the same manner as previously described.

*Tape control*

Referring now to Fig. 14 and assuming that the operator desires to operate the electric sign from a perforated tape, it should be mentioned that the carriage-return conductor 230 in Fig. 14 is connected in multiple with the carriage-return conductor 230 shown in Fig. 5, that the conductor 104 is connected to the conductor 104 shown in Fig. 4, and that the cable 100 is connected in multiple to the cable 100 shown in Figs. 4 and 5 in such a manner that the correspondingly numbered conductors in cable 100 are multipled together. When the operator desires to operate the electric sign from the perforated tape, the operator will operate the key 1213 to energize relay 1214. Relay 1214, upon energizing, causes it upper armatures to connect the feelers or wipers shown to the various conductors indicated. Relay 1214 also starts in operation a motor (not shown) for causing the roller 1215 to rotate at a predetermined speed. Due to the rotation of the roller 1215 the tape 1217 is advanced by the roller until some one or more of the feelers encounters the coded perforations. The tape 1217 is diagrammatically shown as being pre-punched to cause the words Electric and Signs to be displayed on the electric sign. The first perforations, as shown, are encountered by the No. 1 and 6 feelers and therefore a circuit may be traced from grounded wiper 1216, conducting roller 1215 through the feelers 1 and 6 to the armatures 1201 and 1206 to conductors 1 and 6 included in cable 100. Since the connecting relay 322 is energized at this time, then relays 341 and 346 of the set-up relay group SUR-1 are operated in response to the feelers 1 and 6 encountering ground through the perforations. The further advance of the tape disconnects ground from the conductors 1 and 6, thereby causing the operation of the transfer relay 320 and the operation of the connecting relay in the next set-up relay group in the same manner as previously described. The succeeding set-up relay groups are operated in a similar manner by the succeeding perforations in the tape 1217 and when the tape has advanced far enough for feeler 12 to encounter the carriage-return perforation, a circuit may be traced from grounded wiper 1216, conducting roller 1215, through the carriage-return perforation, feeler 12, armature 1211, carriage-return conductor 230, and through the winding of relay 301 over the circuit previously traced. Relay 301 energizes and thereby causes the remaining set-up relay groups in this row to be skipped and likewise causes the first set-up relay group in the next row to be prepared to receive the next registration. When the tape is advanced far enough to encounter the display perforation, a circuit may be traced by way of grounded wiper 1216, conducting roller 1215, the display perforation, feeler 11, armature 1210, conductor 104 extending to Fig. 4, and through the winding of relay 201 to battery. Relay 201, upon energizing, operates the sequence switch SS to cause the previous display to be extinguished and the display just registered to be flashed up on the sign in place thereof in the same manner as described. From the foregoing description it may therefore be readily apparent how the electric sign may be controlled from a perforated tape.

Having described the invention, what is considered new and desired to have protected by Letters Patent is pointed out in the appended claims:

What is claimed is:

1. In a display system, a plurality of lamp panels, a plurality of lamps and character relays in each lamp panel, there being a character relay for each character to be displayed, a group of set-up relays for each panel, means common to said groups of relays for operating a variable combination of relays in each set-up relay group in accordance with variable codes, means for selecting a particular character relay in each panel in accordance with its associated operated relay group combination, means for subsequently operating all said selected character relays simultaneously, circuits controlled by the operated character relays for illuminating certain lamps in each panel in group combinations to form characters corresponding to said codes, means for releasing the operated set-up relays, and means for maintaining said selected character relays energized after release of said set-up relays to maintain said lamps illuminated.

2. In an electric display system, a plurality of lamp panels each having a plurality of lamps and controlling relays therein, a group of set-up relays for each lamp panel, a single key-board common to all said panels and relay groups, each key in said key-board corresponding to a particular controlling relay in each lamp panel, means responsive to successive operations of the keys in said key-board for operating a combination of relays in each successive relay group in accordance with the actuated keys, a circuit for each controlling relay, each relay combination operated in each group preparing the individual circuit extending to the controlling relay in its associated panel corresponding to the key actuated, means for simultaneously completing all said prepared relay circuits to operatively energize said controlling relays having their circuits prepared by said relay combinations, circuits controlled by said energized controlling relays for illuminating a plurality of lamps in each panel to form the characters corresponding to the keys actuated, means for releasing said operated relay combinations, and means for maintaining said controlling relays energized after the release of said operated relay combinations to maintain said lamps illuminated.

3. In an electric display system, a plurality of lamp panels each having a plurality of lamps and controlling relays therein, a group of set-up relays for each panel, a single key-board having keys common to said panels and relay groups and normally connected to one of said relay groups, each key in said keyboard corresponding to a particular controlling relay in each lamp panel, means responsive to each actuation of a key for operating a certain combination of set-up relays in the connected group in accordance with the particular key actuated and for thereafter operatively connecting the next succeeding relay group to said keyboard to prepare such relay group for operation whereby a plurality of registrations are made in successive relay groups in accordance with successive operations of said keys, a circuit for energizing each controlling relay, each operated relay combination in each group preparing the individual circuit extending to the controlling relay in its associated panel corresponding to the key actuated, means for completing all said prepared relay circuits to operatively energize said controlling relays having their circuits prepared by said relay combinations, circuits completed by said energized controlling relays for illuminating a plurality of lamps in each panel to form the characters corresponding to the keys actuated, means for releasing said operated relay combinations to reconnect said normally connected relay group, said groups of set-up relays thereafter again responsive to actuations of said keys for registering such key actuations to prepare the individual circuits to said controlling relays, and means for maintaining said controlling relays energized after the release of said operated relay combinations to maintain said lamps illuminated.

4. In an electric display system, a plurality of lamp panels each having a plurality of lamps and character relays therein, a group of set-up relays for each lamp panel, a single key-board having character keys, each character relay in each lamp panel corresponding to a corresponding character key, a plurality of conductors less in number than said keys extending from said keys toward said relay groups, means for operatively connecting successive relay groups to said conductors in response to successive operations of said keys, means responsive to successive operations of said keys for operating a combination of relays over said conductors in each successive relay group in accordance with the actuated keys, a circuit for energizing each character relay, each operated relay combination in the individual group preparing a circuit extending to the character relay in its associated panel corresponding to the key actuated, means for energizing the particular character relays having their circuits prepared, means controlled by each energized character relay for illuminating a plurality of lamps in each panel to form the characters corresponding to the keys actuated, means for releasing said operated relay combinations to enable said first and second means to reoperate as set forth in response to subsequent key actuations, and means for maintaining said character relays energized after the release of said operated relay combinations to maintain said lamps illuminated during the preparation of a new display.

5. In a display system, an electric sign comprising a plurality of lamp panels each having a plurality of lamps for displaying characters in outline, said panels arranged in a plurality of rows, a typewriter having a plurality of character keys and a single carriage-return key, means responsive to successive operations of said character keys for preparing successive panels in a row to illuminate certain lamps to display the successive characters corresponding to the successive character keys actuated, row space relays individual to each row of lamp panels, means for energizing the row space relays of an individual row in response to a single operation of said carriage-return key for skipping the remaining plurality of panels in said row, means then responsive to subsequent operations of said character keys for preparing successive panels in the next row to illuminate certain lamps to display the successive characters corresponding to the subsequent successive keys actuated, and means for thereafter illuminating the lamps in the said prepared panels to display the characters in outline in accordance with the character keys actuated.

6. In a display system, an electric sign comprising a plurality of lamp panels each having a plurality of lamps for displaying characters in outline, said panels arranged in a plurality of rows, a register individual to each panel, a typewriter having a plurality of character keys and a single carriage-return key, means responsive to successive operations of said character keys for operating successive registers to register the successive characters corresponding to the successive character keys actuated, row-skipping means individual to each row of lamp panels, means for operating the row-skipping means of an individual row in response to a single operation of said carriage-return key for skipping the remaining plurality of unoperated registers individual to the said panels in a given row and for preparing the register individual to the first panel in the next row for operation, said first means then responsive to subsequent operations of said character keys for registering the characters corresponding to the subsequent character keys actuated in the registers individual to the panels in the said next row, and means for thereafter illuminating the lamps in the panels individual to the registers having registrations therein to display the characters in outline in accordance with said registrations.

7. In a display system, an electric sign comprising a plurality of lamp panels each having a plurality of lamps for displaying characters in outline, a register individual to each panel, a typewriter having character keys and a single back-space key, means responsive to successive operations of said character keys for operating successive registers to register the successive characters corresponding to the successive character keys actuated, means responsive to the operation of said back-space key for erasing the registeration in the last register having a registration therein, said first means then responsive to an actuation of a character key for operating said last register to register the new character corresponding to the key actuated, and means for preventing the illumination of the lamps in any of said panels until after the final and corrected registrations.

8. In an electric display system, an electric sign comprising a plurality of lamp panels each having a plurality of lamps for displaying characters in outline, a single key-board having a plurality of character keys and a single display key, means for registering a plurality of characters for display in response to a plurality of actuations of said character keys, means automatically responsive to a single operation of said display key for displaying the said registered characters on said panels, erasing means also responsive to said single display key operation for thereafter erasing the said registered characters from said registering means and for then preparing said registering means to register new characters, and holding means also responsive to said display key operation for maintaining the said characters on display on said panels until said display key is subsequently operated.

9. In a display system, an electric sign for displaying a plurality of characters in outline, a typewriter having character keys, a numeral magnet individual to each numeral character key, a time switch, means for operating said time switch to maintain said switch in operated positions corresponding to the time of day, means responsive to the operation of said character keys for operating said sign to display the characters corresponding to the keys actuated, and means for automatically and selectively operating the said numeral magnets to selectively operate the numeral keys to print the time of day in accordance with the occupied position of the time switch whenever the characters are first displayed on said sign.

10. In an electric display system, a plurality of lamp panels each having a plurality of lamps therein, a display relay group for each panel, a storage relay group for each display group, means for registering a plurality of characters in said storage groups by energizing certain relays in each storage group corresponding to such characters, a first circuit for locking each energized storage relay in energized position, circuits prepared for energizing a display relay in each display group by the registration in each storage group, circuits prepared for illuminating the lamps in said panels by the energized display relays, a second circuit for completing the prepared energizing circuits of said display relays, a third circuit for locking the energized display relays in energized position, a fourth circuit for completing the illuminating circuits prepared by the energized display relays, a device having a normal and a plurality of operated positions, means for operating said device from its normal position and automatically through its operated positions back to its normal position, and means responsive to the operations of said device for, first, opening said fourth circuit to extinguish any illuminated lamps, second, for opening said third circuit to deenergize the energized display relays, third for closing said second circuit to energize the display relays having their energizing circuits prepared by the energized storage relays and for reclosing said third circuit to lock energized the energized display relays, fourth, for closing said fourth circuit to illuminate the lamps having their circuits prepared by the energized display relays and for opening said first circuit to deenergize the energized storage relays, and, fifth, for reclosing said first circuit to provide a locking circuit for any subsequently energized storage relay.

11. In an electric sign display system wherein storage relays are energized for registering characters and display relays are prepared for operation by the energized storage relays to prepare circuits to illuminate the lamps in successive lamp panels to outline the registered characters, a device having a normal and a plurality of operated positions, means for operating said device from its normal position, means responsive to the operation of said device from its normal position for automatically operating said device sequentially through its operated positions back to its normal position, and means responsive to the automatic sequential operations of said device for, first, extinguishing all the illuminated lamps, second, releasing all the operated display relays, third, energizing and locking operated the display relays prepared for operation by the energized storage relays, fourth, illuminating the lamps over the circuits prepared by the operated display relays and for releasing any energized storage relay, and, fifth, providing a locking circuit for any subsequently energized storage relay.

12. In an electric sign for displaying characters in outline in successive lamp panels, lamps in said panels, a source of current for illuminating said lamps, circuits for said lamps, registering means for registering characters, display relays controlled by the operated registering means for preparing certain of said lamp circuits in accordance with the character registered, a device having a normal and a plurality of operated positions, means for operating said device from its normal position and automatically through its operated positions back to normal position, and means responsive to the operation of said device for first disconnecting said source from said lamps, second, for releasing the operated display relays, third, for operating the display relays prepared by the operated registering means, fourth, for releasing the operated registering means, fifth, for connecting said source to certain lamps in accordance with the operated display relays, and, sixth, for preparing said registering means for subsequent operation.

MARTIN L. NELSON.